US012674340B2

(12) United States Patent
Weiershausen

(10) Patent No.: US 12,674,340 B2
(45) Date of Patent: Jul. 7, 2026

(54) ELECTRONIC PADLOCK

(71) Applicant: ABUS August Bremicker Söhne KG, Wetter-Volmarstein (DE)

(72) Inventor: Bernd Weiershausen, Rehe (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 77 days.

(21) Appl. No.: 18/402,817

(22) Filed: Jan. 3, 2024

(65) Prior Publication Data

US 2024/0240495 A1 Jul. 18, 2024

(30) Foreign Application Priority Data

Jan. 12, 2023 (DE) ......................... 102023100671.1

(51) Int. Cl.
*E05B 67/06* (2006.01)
*E05B 67/22* (2006.01)

(52) U.S. Cl.
CPC ............ *E05B 67/063* (2013.01); *E05B 67/22* (2013.01)

(58) Field of Classification Search
CPC ........ E05B 67/00; E05B 67/06; E05B 67/063; E05B 67/22
See application file for complete search history.

(56) References Cited

U.S. PATENT DOCUMENTS 5,377,511 A 1/1995 Meckbach
6,401,501 B1 6/2002 Kajuch et al.
10,030,417 B1 7/2018 Ho
11,352,817 B2 6/2022 Gengler et al.
2022/0282527 A1 9/2022 Banse

FOREIGN PATENT DOCUMENTS

| | | | | |
|---|---|---|---|---|
| CN | 207177524 | U | | 4/2018 |
| CN | 109184378 | A | * | 1/2019 |
| CN | 110607958 | A | | 12/2019 |
| CN | 215889668 | U | | 2/2022 |
| DE | 4323693 | A1 | | 1/1995 |
| DE | 102019113163 | A1 | | 11/2020 |
| DE | 102019113184 | B4 | | 8/2021 |
| DE | 102021122250 | B3 | | 10/2022 |
| KR | 101305966 | B1 | * | 9/2013 |

OTHER PUBLICATIONS

Computer Generated Translation of CN 109184378 A, Generated on May 14, 2025, https://worldwide.espacenet.com/patent/ (Year: 2025).*

* cited by examiner

*Primary Examiner* — Alyson M Merlino
(74) *Attorney, Agent, or Firm* — Dickinson Wright PLLC

(57) ABSTRACT

An electronic lock has a lock body and a hoop that can be selectively locked to the lock body or released from the lock body. The lock body comprises an electromechanical locking device having a cam rotatable about an axis of rotation and the hoop comprises a first introduction section that can be introduced into the lock body and having a lower holding section and an upper locking notch. The cam is configured, in a locking rotational position, to engage into the upper locking notch of the first introduction section and to lock the hoop to the lock body; in an unlocking rotational position, to release the upper locking notch and to hold the first introduction section at the lower holding section; and in a removal rotational position, to release the lower holding section of the first introduction section and to thereby release the hoop for a complete detachment from the lock body.

22 Claims, 16 Drawing Sheets

ELECTRONIC PADLOCK

CROSS-REFERENCE TO RELATED APPLICATION

This application claims the benefit and priority of German Patent Application No. DE 102023100671.1 filed on Jan. 12, 2023. The entire disclosure of the above application is incorporated herein by reference.

FIELD OF THE INVENTION

The invention relates to an electronic padlock comprising a lock body and at least one hoop that may be selectively locked to the lock body or released from the lock body. The lock body comprises a first introduction opening for introducing a first introduction section of the at least one hoop and a second introduction opening for introducing a second introduction section of the at least one hoop into the lock body, wherein the first introduction section of the at least one hoop and the second introduction section of the at least one hoop are connected to one another by a connection section and may be introduced along an introduction direction into the first introduction opening and the second introduction opening. The lock body further comprises an electromechanical locking device having a cam rotatable about an axis of rotation, an electric motor for driving the cam, and a control circuit.

BACKGROUND OF THE INVENTION

Such padlocks may in particular be used to guide the hoop through or around a section of an object to be secured in order to then form a closed loop of the hoop and the lock body by locking the hoop to the lock body, and to thereby secure the object. For example, the hoop of a padlock for securing a door or a flap may be guided through an eyelet of a hasp and may then be locked to the lock body to prevent the door or flap from opening. Furthermore, padlocks may be used, for example, to secure two-wheelers, in particular bicycles, against theft or an unauthorized riding away, for which purpose the hoop of the padlock may, for instance, be guided around a frame section of the two-wheeler and a stationary object, for example a bicycle stand, and may then be locked to the lock body such that the frame section of the two-wheeler is securely connected to the stationary object and the two-wheeler is connected to the stationary object. Alternatively thereto, the hoop may, for example, also be guided around a spoke of a wheel of the two-wheeler such that the padlock prevents a rotation of the wheel after a locking of the hoop and secures the two-wheeler against an unauthorized riding away.

Since the padlock is electronic and has an electromechanical locking device, a comfortable possibility of handling the padlock may be created for the user without a mechanical key having to be taken along to actuate the padlock, for example. However, since padlocks may be used for a variety of different applications, it may be desired to be able to flexibly adapt the padlock to the requirements of the respective use and to be able to use a single padlock, for example, selectively for securing a door or flap or for securing a two-wheeler. To achieve this, it may, for example, be necessary to be able to connect different hoops to the lock body in order, for example, to be able to form loops of different sizes from the hoop and the lock body and, for instance, to enable a comfortable securing of a two-wheeler by using a larger hoop and, on the other hand, a comfortable securing of a hasp by using a smaller hoop. Furthermore, a reliable and secure locking of the hoop to the lock body is, nevertheless, absolutely essential in any application.

SUMMARY OF THE INVENTION

It is therefore an object of the invention to provide an electronic padlock with flexible possibilities of use that also enables a reliable and secure locking of the hoop introduced into the lock body.

This object is satisfied by an electronic padlock having the features of claim. More specifically, the electronic padlock comprises a lock body and at least one hoop that can be selectively locked to the lock body or released from the lock body. The lock body comprises a first introduction opening for introducing a first introduction section of the at least one hoop, a second introduction opening for introducing a second introduction section of the at least one hoop into the lock body, an electro-mechanical locking device having a cam rotatable about an axis of rotation and an electric motor for driving the cam, and a control circuit. The first and second introduction sections of the at least one hoop are connected to one another by a connection section and can be introduced along an introduction direction into the first and second introduction openings.

In the padlock described herein, the first introduction section of the at least one hoop has a lower holding section with respect to the introduction direction and an upper locking notch and the cam is configured:

- in a locking rotational position, to engage into the upper locking notch of the first introduction section and to lock the hoop to the lock body;
- in an unlocking rotational position, to release the upper locking notch and to hold the first introduction section at the lower holding section; and
- in a removal rotational position, to release the lower holding section of the first introduction section and to thereby release the hoop for a complete detachment from the lock body.

Furthermore, the control circuit is configured to control the electric motor to selectively drive the cam into the locking rotational position, the unlocking rotational position or the removal rotational position.

Since the cam may be selectively rotated into the locking rotational position, the unlocking rotational position or the removal rotational position, the hoop may be selectively locked to the lock body, held at the lock body via the lower holding section of the first introduction section, or completely released for a detachment from the lock body. The second introduction section may in particular be releasable from the lock body in the unlocking rotational position of the cam so that the loop formed by the lock body and the hoop in the locked state of the hoop may be opened by moving the cam into the unlocking rotational position, but without the hoop having to be completely released from the lock body.

For example, the hoop may be formed as a substantially U-shaped rigid U-hoop and may have a long limb and a short limb, wherein the long limb may form the first introduction section and the short limb may form the second introduction section. In the unlocking rotational position of the cam, the short limb of the U-hoop may be releasable from the lock body while the long limb of the hoop is held at the lower holding section by the cam. The U-hoop held at the lock body at the lower holding section of the first introduction section may in particular be pivotable about the long limb in the unlocking rotational position of the cam to be able to comfortably guide the hoop around a section of an object to be secured.

By reintroducing the second introduction section, in particular a short limb of a U-hoop, into the first introduction opening, the first introduction section, which is connected to the second introduction section via the connection section, may in particular also be movable along the introduction direction so that the upper locking notch may be arranged at the same level as the cam by introducing the hoop and the hoop may then be locked to the lock body by the rotation of the cam into the locking rotational position and by the engagement of the cam into the locking notch of the first introduction section.

Thus, while the unlocking rotational position of the cam may allow the second introduction section to be released from the lock body to be able to release a secured object or to guide the hoop around a section of an object to be secured without having to completely separate the hoop from the lock body, the rotation of the cam into the removal rotational position also allows the lower holding section of the first introduction section to be released and the hoop to be selectively completely released from the lock body.

For example, such a complete release of the hoop may be provided to be able to separate a relatively long or large U-hoop for securing a two-wheeler from the lock body and to comfortably guide it around a frame section of the two-wheeler and a stationary object, whereupon the hoop may be reintroduced into the lock body and may be locked by rotating the cam into the locking rotational position. The removal rotational position of the cam may thus allow a comfortable operation of the padlock in situations where the lock body and the hoop, for instance, have to be brought together from different sides to secure an object.

In particular, the removal rotational position of the cam may, however, make it possible to selectively connect different hoops to the lock body and to thereby increase the flexibility of the electronic padlock. For example, after removing a hoop, a hoop of a different type may be introduced so that the lock body may, for example, be selectively used with a U-hoop, a chain hoop or a rope hoop. Furthermore, due to the possibility of completely releasing the hoop from the lock body, different hoops of basically the same type, for instance different U-hoops, but of different sizes, different materials and/or different diameters may be selectively connectable to the lock body to thereby be able to use hoops adapted to different requirements or conditions. Thus, provision may, for example, be made to use a U-hoop of a larger diameter, and thus a U-hoop that is as stable as possible, to secure a two-wheeler, whereas, for example, a U-hoop of a smaller diameter may be required to be able to selectively use the electronic padlock for securing a comparatively small hasp.

Since the cam is further configured to engage into the upper locking notch of the first introduction section in the locking rotational position, the cam may in particular directly mechanically contact the locking notch. In this regard, the cam may in particular not only be provided to displace a separate intermediate element, in particular a latch, for example a spherical latch, towards the first and/or the second introduction opening of the lock body or—in the unlocking rotational position or the removal rotational position—to release it for a radially inward movement with respect to the axis of rotation of the cam in order to lock the hoop or to release it for a detachment from the lock body. Rather, the locking of the hoop may take place directly by the cam without a further latch element being provided.

Similarly, the cam may also be configured to directly mechanically contact the lower holding section of the first introduction section in the unlocking rotational position to thereby hold the first introduction section at the lock body. For example, the lower holding section may be formed as a plate-like radial widening of the first introduction section that abuts the cam on a movement directed out of the lock body when the cam is in the unlocking rotational position. The holding of the first introduction section may thus also take place directly by the cam and not by an intermediate element contacted by the cam, for example a latch.

Due to such a direct engagement of the cam into the upper locking notch and a direct holding of the lower holding section, a secure and reliable locking of the hoop to the lock body may be achieved since—unlike in the case of padlocks known from the prior art comprising latches driven by a cam—no intermediate elements are required for locking the hoop that may in any case generally offer opportunities for manipulation. Rather, the cam may provide a single stable locking element. The cam may furthermore be axially secured, in particular by an abutment at a stable housing of the padlock, so that forces developed, for instance, by a pulling at the hoop in the course of a break-open attempt may be directly led off to the housing. Furthermore, the diameters of the introduction sections may be matched to the diameters of the introduction openings such that any introduction of objects for manipulating the rotational position of the cam through the introduction openings may be prevented and the cam may not be moved out of the locking rotational position by unauthorized persons. Furthermore, the reduction in the number of components of the electromechanical locking device and the elimination of intermediate elements to be driven by a cam are accompanied by a simplified assembly of the padlock since a smaller number of components have to be introduced into the lock body.

As already explained, the at least one hoop may in particular be configured as a rigid U-hoop, wherein the first introduction section and the second introduction section may be formed by respective limbs of the U-hoop. In this respect, the first introduction section may in particular be formed by a long limb of the U-hoop and the second introduction section may in particular be formed by a short limb of the U-hoop, wherein embodiments with limbs of equal length may, however, also be provided. The connection section may be formed by a rigid section, in particular a curved section, that connects the two limbs.

Furthermore, the hoop may, for example, be configured as a flexible rope hoop or chain hoop in which the introduction sections may in particular be formed by respective bolts that are connected to one another by a flexible connection section configured as a rope, in particular a wire rope, or a chain. In such embodiments, provision may generally also be made that the cam is configured to continue to engage into the upper locking notch of the first introduction section in the unlocking rotational position, but to release the second introduction section for a detachment from the lock body since, due to the flexible connection with the second introduction section, a partial detachment of the first introduction section does not necessarily have to be required in a rope lock or chain lock to be able to detach the second introduction section from the lock body. Therefore, the first introduction section of a rope lock or chain lock does not necessarily have to have a lower holding section either.

Furthermore, in some embodiments, the second introduction section may have a further locking notch and the cam may be configured to also engage into the further locking notch in the locking rotational position in order to directly lock both the first introduction section and the second introduction section.

Further embodiments are explained in the dependent claims, in the description, and in the Figures.

In some embodiments, the second introduction section may be releasable from the lock body in the unlocking rotational position of the cam. As already explained, the second introduction section may in particular be formed by a shorter limb of a U-hoop having a long limb and a short limb, wherein the U-hoop may in particular be pivotable about the lower holding section, which is formed at the long limb, in the unlocking rotational position of the cam. Alternatively thereto, the introduction sections may also be formed by respective bolts connected to one another, for example by a rope or a chain, wherein the bolt forming the second introduction section may be releasable from the lock body when the cam is in the unlocking rotational position.

In general, in some embodiments, the first introduction section may have a greater extent with respect to the introduction direction than the second introduction section, wherein the hoop may be pivotable about the first introduction section when the cam is in the unlocking rotational position.

In some embodiments, the cam may include:

- a first locking section that projects radially outwardly with respect to the axis of rotation and that is configured to engage into the upper locking notch in the locking rotational position of the cam;
- a blocking section that is radially inwardly offset relative to the first locking section and that is configured to come into contact with the lower holding section of the first introduction section in the unlocking rotational position of the cam; and
- a release section that is radially inwardly offset relative to the blocking section and that is oriented towards the first introduction opening in the removal rotational position.

In particular, the first locking section may be oriented towards the first introduction opening when the cam is rotated into the locking rotational position and the blocking section may be oriented towards the first introduction opening when the cam is rotated into the unlocking rotational position. Moreover, both the first locking section and the blocking section may have such a radial extent that the first locking section and the blocking section engage into the first introduction opening when the cam is rotated into the locking rotational position and the unlocking rotational position, respectively. The first locking section may further contact a boundary, in particular a lower boundary, of the first locking notch when the hoop is introduced into the lock body and the cam is in the locking rotational position and the blocking section may contact the holding section when the hoop is introduced into the lock body and the cam is in the unlocking rotational position. The release section, on the other hand, may have such a radial extent that the release section does not engage into the first introduction opening when the cam is rotated into the removal rotational position so that the first introduction opening may be released in the removal rotational position of the cam and the first introduction section may be completely removed from the first introduction opening.

In some embodiments, the axis of rotation of the cam may be aligned in parallel with the introduction direction and the first introduction opening and the second introduction opening may be arranged radially offset from the axis of rotation of the cam. The first introduction opening and the second introduction opening may further open into respective introduction passages which extend along the introduction direction and in which the first introduction section and the second introduction section of the hoop introduced into the lock body may extend.

In this regard, the first locking section may be configured to engage into such an introduction passage when the cam is rotated into the locking rotational position and the blocking section may be configured to engage into the introduction passage when the cam is rotated into the unlocking rotational position, whereas the release section may be configured not to project into such an introduction passage when the cam is rotated into the removal rotational position and the release section is oriented towards the introduction passage.

In some embodiments, the cam may furthermore have a further release section that is radially inwardly offset relative to the blocking section and that is oriented towards the second introduction opening in the removal rotational position of the cam. The further release section may in particular have a radial extent with respect to the axis of rotation of the cam that corresponds to a radial extent of the release section. The further release section may in particular be configured not to engage into the second introduction opening or a second introduction passage when the cam is rotated into the removal rotational position. Provision may therefore be made that, in the removal rotational position, the cam does not engage into either the first introduction opening or the second introduction opening so that a removed hoop may be introduced into the lock body without being able to abut the cam and thereby damage the cam or another component of the electromechanical locking device.

Furthermore, in some embodiments, the cam may have an unlocking section that is oriented towards the second introduction opening in the unlocking rotational position of the cam. In this respect, the extent of the unlocking section of the cam in the radial direction may in particular be of such a kind that the unlocking section does not engage into the second introduction opening in the unlocking rotational position so that the second introduction section may be released from the lock body when the cam is in the unlocking rotational position. For this purpose, the unlocking section may in particular be radially inwardly offset relative to the blocking section and/or have a radial extent corresponding to the release section and/or the further release section.

In some embodiments, the cam, starting from the locking rotational position, may be moveable into the unlocking rotational position by a rotation along a first direction of rotation and may be moveable into the removal rotational position by a rotation along a second direction of rotation opposite the first direction of rotation. Due to such an opposite rotation of the cam during the operation of the padlock, that section of the cam, in particular said first locking section, which engages into the upper locking notch of the first introduction section in the locking rotational position of the cam may be rotated only slightly, and in particular by less than 90 degrees, out of the locking rotational position.

The section of the cam engaging into the locking notch may in particular define a maximum radial extent of the cam that is deflected with respect to a connection line between the introduction openings by the rotation of the cam out of the locking rotational position. Since this deflection may be kept small by the rotation of the cam along opposite directions of rotation, the extent of the lock body required to allow the rotational movements of the cam may also be limited along a transverse direction oriented perpendicular to the connection line between the introduction openings so that a narrow design of the lock body may be achieved. The opposite rotation of the cam in particular enables a reduction in the extent of the lock body in the transverse direction in embodiments, explained in more detail below, in which the cam has a second locking section to also engage into a locking notch formed at the second introduction section in the locking rotational position so that the cam is deflected at both sides with respect to the connection line between the introduction openings during rotations starting from the locking rotational position.

In some embodiments, the cam may be movable, starting from the locking rotational position, into the unlocking rotational position by a rotation about less than 45 degrees, in particular by a rotation about 30 degrees or less than 30 degrees. Alternatively or additionally, in some embodiments, the cam may be movable, starting from the locking rotational position, into the removal rotational position by a rotation about less than 45 degrees, in particular by a rotation about 30 degrees or less than 30 degrees. Furthermore, in some embodiments, provision may alternatively or additionally be made that the cam may be moved, starting from the unlocking rotational position, into the removal rotational position by a rotation about less than 90 degrees, in particular by a rotation about 60 degrees or less than 60 degrees.

In particular in embodiments in which the cam may be moved from the locking rotational position into the unlocking rotational position by a rotation along a first direction of rotation and into the removal rotational position by a rotation along a second direction of rotation opposite the first direction of rotation, a narrow design of the lock body may be realized by performing only such minor rotational movements.

In some embodiments, the lock body may have a maximum extent—in a transverse direction oriented perpendicular to the introduction direction and perpendicular to a connection line between the first introduction opening and the second introduction opening—which is smaller than a maximum extent of the cam in a plane oriented perpendicular to the introduction direction. In this regard, the lock body may in particular be narrow and may primarily extend along the connection line between the first introduction opening and the second introduction opening. Such a narrow design of the lock body may in particular be achieved in embodiments in which the cam does not have to be rotated by 90 degrees or more along a direction of rotation in order to be moved between the locking rotational position, the unlocking rotational position and the removal rotational position.

The upper locking notch may, in some embodiments, be rectangular in cross-section and may have a planar boundary surface that is configured to contact a planar abutment surface of the cam when the hoop is locked to the lock body. Such a planar contact may in particular enable a form-fitting holding of the first introduction section by the cam. The boundary surface and the abutment surface may further in particular be oriented perpendicular to the introduction direction so that the boundary surface and the abutment surface may in particular be oriented perpendicular to a force to be developed by a pulling at the hoop during a break-open attempt in order to prevent a redirecting of such a force, which could possibly lead to a torque exerted on the cam, and to achieve a secure locking.

The second introduction section may have a further locking notch in some embodiments, wherein the cam may be configured to engage into the further locking notch in the locking rotational position and to release the further locking notch in the unlocking rotational position. For this purpose, the cam may in particular have a second locking section that is configured to engage into the further locking notch in the locking rotational position of the cam. The second locking section may in particular have a radial extent corresponding to a radial extent of the first locking section already mentioned. Furthermore, the further locking notch may be formed in a manner corresponding to the upper locking notch of the first introduction section and may be rectangular in cross-section, for example. The upper locking notch of the first introduction section and the further locking notch may in particular be arranged axially at the same level with respect to the introduction direction when the hoop is introduced into the lock body.

In some embodiments, the first locking section and the aforementioned second locking section may be offset from one another by less than 180 degrees with respect to the axis of rotation. In such embodiments, the axis of rotation of the cam may in particular be arranged off-center with respect to the lock body and/or may not intersect a connection line from the first introduction opening to the second introduction opening, in particular a connection line between respective centers of the introduction openings. Such an off-center arrangement may in particular make it possible to provide space for further components of the electromechanical locking device and/or of the control circuit at a side of the lock body facing away from the axis of rotation. A sensor for detecting the hoop and/or the rotational position of the cam may in particular be arranged at this side, as will be explained in even more detail below.

In some embodiments, the holding section may be formed by a peripheral radial widening of the first introduction section, wherein the holding section may in particular be formed at a lower end section of the first introduction section. Furthermore, the holding section may in particular have a flat contact surface that may abut the already mentioned abutment surface of the cam when the cam is rotated into the unlocking rotational position.

In some embodiments, the lock body may further have a preloading element that is configured to preload the hoop, which is introduced into the lock body, against the introduction direction. It may in particular be achieved by such a preloading element that the first introduction section, and thus the hoop as a whole, is urged out of the lock body when the cam is rotated into the unlocking rotational position so that the user of the lock does not have to separately pull the hoop out of the lock body. Furthermore, the preloading element may serve to hold the lower holding section in contact with the cam when the cam is rotated into the unlocking rotational position in order, for example, to allow a U-hoop to pivot about a long limb without the U-hoop being able to slip back into the lock body. The preloading element may be configured as a spring, for example.

In some embodiments, the lock body may comprise a detent for the hoop that is configured to hold the hoop, which is introduced into the lock body, against the preload in the lock body.

The detent may in particular be configured to hold the hoop, which is introduced into the lock body, in the lock body such that the upper locking notch of the first introduction section is axially arranged at the same level as the cam with respect to the axis of rotation of the cam so that the cam may be moved into the locking rotational position without abutting the introduction section. Thus, the detent may in particular serve to hold the hoop against the preload in a position in which the cam is released for a trouble-free rotation into the locking rotational position so that a user of the padlock does not have to hold the introduced hoop specifically against the preload to be able to lock the hoop.

The detent may in particular be configured to hold the hoop at the lower holding section of the first introduction section. Furthermore, in some embodiments, the detent may be arranged in alignment with the first introduction opening to be able to hold the hoop in the lock body via the first introduction section.

The detent may generally only be provided to hold the hoop against the preload in the lock body, but without fulfilling a safety-relevant function with regard to the locking. Rather, the locking may take place through the engagement of the cam into the locking notch. Thus, in some embodiments, the detent may be made of zinc die-cast or plastic and may therefore be easy to manufacture.

In some embodiments, the cam may be configured to contact the detent on a rotation from the locking rotational position into the unlocking rotational position and to move the detent into a release position in which the detent releases the hoop for a detachment from the lock body.

The detent may in particular be pivotable between a blocking position in which the detent holds the hoop, which is introduced into the lock body, in the lock body and the release position and the cam may be configured to contact the detent with an entrainer section of the cam during a rotation from the locking rotational position into the unlocking rotational position and to pivot said detent into the release position in order to release the hoop for a detachment from the lock body. During a subsequent movement of the hoop along the introduction direction into the lock body, the detent held in the release position by the entrainer section may in particular be able to be urged under the cam by the hoop and the detent may furthermore be preloaded towards a blocking position so that the detent may automatically snap back into the blocking position and hold the hoop as a result of being urged under the cam, in particular under the entrainer section. For this purpose, a pivot axis of a pivotable detent may in particular be axially guided in a groove with respect to the introduction direction to enable an axial movement of the detent for urging the detent under the cam and a pivoting of the detent urged under the cam into the blocking position.

If the cam is rotated into the locking rotational position after the detent has been urged under the cam, the detent may in particular be axially moved against the introduction direction as soon as the detent is released by the cam, in particular an entrainer section of the cam, for such an axial movement. For this purpose, the detent may in particular be preloaded against the introduction direction or the axial movement of the detent released by the cam may take place against the introduction direction due to the already mentioned preloading of the hoop. However, the axial movement of the detent against the introduction direction may be limited by an abutting of a boundary surface of the upper locking notch of the first introduction section at an abutment surface of the cam or by a housing abutment, which is provided specifically for the detent, at a housing of the padlock. As a result of the rotation of the cam into the locking rotational position, the detent may in particular be axially arranged again such that the detent may be contacted by an entrainer section of the cam.

Since the detent is configured to hold the hoop in the lock body, a change in the axial position of the detent may also affect the axial position of the held hoop that is connected to the detent. To enable an engagement of the cam into the locking notch when the detent is urged under the cam, and in particular under the entrainer section, and when the detent is axially arranged such that the detent may be pivoted by the entrainer section of the cam, the locking notch may therefore, in some embodiments, have an axial extent that is greater than the axial extent of the cam so that the cam may engage into the locking notch in different axial positions of the detent and of the held hoop.

In some embodiments, the lock body may comprise a sensor that is configured to detect when the hoop is located in the lock body in a locking position in which the hoop may be locked to the lock body, and to detect when the first introduction section is held at the holding section by the cam positioned in the unlocking rotational position. The sensor may further be configured to transmit respective detection signals to the control circuit.

Since the lock body may comprise such a sensor, a locking position of the hoop and an unlocking position may thus in particular be detected, wherein the control circuit may in particular be configured to distinguish between the respective detection signals. In the locking position, the upper locking notch may in particular be at one level with the cam with respect to the introduction direction so that the cam, by rotating into the locking rotational position, may be brought into engagement with the upper locking notch in a trouble-free manner. By detecting the locking position of the hoop, it may thus be ensured that the cam is only rotated into the locking rotational position when such a rotational movement is enabled and is not blocked by the first introduction section. In some embodiments, the control circuit may therefore be configured to only rotate the cam into the locking rotational position when the sensor detects the hoop in the locking position.

The lock body may, in some embodiments, have a contact element that is configured to contact the sensor when the hoop is in the locking position and to release the sensor when the hoop is held at the holding section by the cam.

The contact element may in particular be the aforementioned detent that may contact the sensor in the blocking position and release it in the release position. In this regard, features explained below with respect to the contact element may also be provided for the detent and may in particular also be provided in embodiments that indeed have a detent, but do not have a sensor that may be contacted by the detent.

The contact element may be arranged in alignment with the first introduction opening in some embodiments. The contact element may therefore in particular be contactable by the first introduction section to be influenceable by a movement of the first introduction section and to be able to come into contact with the sensor when the first introduction section is introduced into the lock body or the first introduction opening to such an extent that the locking notch is arranged at one level with the cam with respect to the introduction direction and the cam may be rotated into the locking rotational position.

The contact element may be pivotable in some embodiments and the cam may be configured to pivot the contact element with an entrainer section on a rotation from the locking rotational position into the unlocking rotational position and to thereby release the contact of the contact element to the sensor. The contact section may in particular be pivotable about a pivot axis oriented perpendicular to the axis of rotation. Furthermore, as already explained, the contact element may act as a detent for the hoop, wherein the contact section or the detent may be pivotable from a blocking position into a release position by the rotation of the cam into the unlocking rotational position in order, on the one hand, to interrupt the contact to the sensor and, on the other hand, to release the hoop for a detachment from the lock body.

In some embodiments, the contact element may be preloaded towards the sensor and may be able to be urged under the entrainer section by moving the hoop along the introduction direction into the locking position. The contact element urged under the entrainer section may further be configured to pivot towards the sensor as a result of the preload and to contact the sensor. In such embodiments, the contact element may in particular be able to be urged under the entrainer section when the cam is in the unlocking rotational position.

Furthermore, the contact element may in particular be configured to contact the entrainer section beneath the entrainer section when the contact element is urged under the cam and the cam is in the unlocking rotational position. As already explained above with regard to the detent, the contact element may in particular be pivotable about an axially displaceable pivot axis to enable the movement under the cam, on the one hand, and the pivoting towards the sensor, on the other hand.

In some embodiments, the control circuit may be configured to control the electric motor to drive the cam from the unlocking rotational position into the locking rotational position in case the contact element first releases the sensor and then contacts the sensor.

If the sensor is released by the contact element, the hoop is not in the locking position, but is in particular held at the holding section. However, in case such a release of the sensor is followed by a contact by the contact element, the hoop has been transferred into the locking position or fully introduced into the lock body so that a locking is apparently to take place. In this regard, by simply transferring the hoop into the locking position, whereby the contact element may be brought into contact with the sensor, a locking command may be transmitted to the control circuit that may implement the locking command accordingly by rotating the cam into the locking position. In case the contact element furthermore acts as a detent for the hoop, it may furthermore be ensured by the detected contact of the sensor that the hoop has not been released from the locking position and that the cam may rotate trouble-free into the locking rotational position.

In some embodiments, the sensor may have an upper sensor section and a lower sensor section and may be configured to transmit a first detection signal to the control circuit when the upper sensor section is contacted and to transmit a second detection signal to the control circuit when the lower sensor section is contacted.

In some embodiments, the control circuit may be configured to distinguish between the first detection signal and the second detection signal.

Such a configuration of the sensor with an upper sensor section and a lower sensor section may in particular be provided in embodiments in which the contact element may be urged under the cam when the cam is in the unlocking rotational position. Due to this urging under the cam, the contact element may in particular contact the lower sensor section, whereas, by rotating the cam into the locking rotational position, the contact element may be released for an axial movement to then contact the upper sensor section. This may in particular also make it possible to detect, by means of the sensor, whether the hoop is already locked since the upper sensor section is contacted in this case, whereas the lower sensor section is contacted when a locking is to take place.

The contact element may be preloaded towards the upper sensor section in some embodiments. This may, for example, take place by a preloading element associated with the contact element and/or by a preloading of the hoop, which is held by the contact element, against the introduction direction. It may in particular be achieved by such a preload that the contact element contacts the upper sensor section when the contact element is released, in particular by the cam, for an axial movement towards the upper sensor section.

In some embodiments, the control circuit may be configured to control the electric motor to drive the cam from the unlocking rotational position into the locking rotational position in case the contact element first releases the sensor and then contacts the sensor at the lower sensor section.

As already explained, this may in particular be provided in embodiments in which the contact element may be urged under an entrainer section of the cam when the cam is in the unlocking rotational position and a locking of the hoop is to take place so that a locking command may be uniquely transmitted and identified as a contact of the lower sensor section following a release of the sensor.

The contact element may, in some embodiments, be configured to contact the sensor at the upper sensor section as a result of a movement of the cam from the unlocking rotational position into the removal rotational position.

Provision may in particular be made that the mentioned entrainer section of the cam releases the contact element for a pivoting as a result of the rotation of the cam into the removal rotational position, for which purpose a direction of rotation of the cam during a rotation from the unlocking rotational position into the removal rotational position may in particular be opposite to a direction of rotation of the cam during a rotation from the locking rotational position into the unlocking rotational position. However, as a result of this rotation of the cam, the contact element is only released for a pivot movement, but is not urged under the cam so that the contact element may contact the upper sensor section. In case a contacting of the upper but not the lower sensor section thus takes place in response to a release of the sensor, it may be determined that a locking is not, for instance, to take place, but that the cam was rotated into the removal rotational position in which the hoop may be completely released from the lock body.

In some embodiments, the contact element may be preloaded towards the sensor and may be pivotable against the preload by introducing the hoop that is released from the lock body into the lock body. The contact element may in particular be pivotable against the preload by the first introduction section when the hoop is being introduced into the lock body. To enable such a pivoting, the contact element may in particular have a contact surface slanted with respect to the introduction direction for the hoop, in particular for the first introduction section, so that a movement of the hoop along the introduction direction may be redirected into a pivot movement of the contact element. When the hoop reaches the locking position, the contact element may, however, pivot towards the sensor again due to the preload and contact the sensor so that the locking position may be detected.

As already explained, the contact element may furthermore in particular form a detent for the hoop to hold the hoop in the lock body, wherein the detent, in particular by a corresponding slanted contact surface, may be pivotable, by introducing the hoop, against a preload from a blocking position into a release position in order to enable an introduction of the hoop. However, the detent may further be configured to snap back into the blocking position when the hoop reaches the locking position and may hold the hoop in the locking position to be able to ensure a trouble-free rotation of the cam into the locking rotational position. For this purpose, the detent may in particular have a blocking surface that adjoins the slanted contact surface, that is oriented perpendicular to the introduction direction, and that may cooperate with a contact surface, which is formed at the first introduction section, in particular the lower holding section, and which is likewise oriented perpendicular to the introduction direction, to hold hoops in the lock body.

In some embodiments, the contact element may be configured to hold the hoop, which is in the locking position, in the lock body.

The control circuit may, in some embodiments, be configured to control the electric motor to drive the cam from the removal rotational position into the locking rotational position in case the sensor, after a transmission of the first detection signal, is released by the contact element and is then contacted again.

In some embodiments, if the cam is in the removal rotational position and the hoop is fully released from the lock body, the contact element may contact the sensor at the upper sensor section so that the first detection signal may be transmitted to the control circuit. If the hoop is then introduced into the lock body and transferred into the locking position, the contact element may first be removed from the sensor, wherein the contact element may contact the sensor again when the hoop reaches the locking position. In this regard, it may be detected by the described sequence of detection signals that a hoop released from the lock body has been introduced into the lock body so that a locking command may be immediately transmitted by the complete introduction of the hoop into the lock body and the generation of said sequence, whereupon the control circuit may rotate the cam into the locking rotational position.

The contact element may, in some embodiments, be configured to contact the sensor at the upper sensor section when the hoop is locked to the lock body.

Furthermore, in some embodiments, the locked hoop may be movable along the introduction direction and the contact element may be configured to contact the sensor at the lower sensor section as a result of a movement of the locked hoop along the introduction direction. In such embodiments, the control circuit may be configured to control the electric motor to drive the cam from the locking rotational position into the unlocking rotational position in case the sensor first transmits the first detection signal and then transmits the second detection signal.

Since the locked hoop may be movable along the introduction direction, the hoop and thereby the contact element may be axially movable by pressing the hoop so that the sensor that has initially been contacted at the upper sensor section by the contact element when the hoop is locked may be contacted at the lower sensor section. The control circuit may be configured to identify said sequence of a second detection signal, which follows the first detection signal, as an unlocking command and to control the electric motor to drive the cam from the locking rotational position into the unlocking rotational position in response to the unlocking command. In this regard, in some embodiments, an unlocking command may be transmittable to the control circuit by pressing the locked hoop.

The hoop and the contact element may in particular be coupled with respect to axial movements when the hoop is locked to the lock body. Furthermore, an extent of the upper locking notch along the introduction direction may be greater than an extent of the cam, in particular of the first locking section of the cam, to enable an axial movement of the locked hoop relative to the cam. Thus, a user only has to move the hoop along the introduction direction to be able to easily transmit an unlocking command to the control circuit.

In some embodiments, the lock body may further have a radio module for receiving control signals, wherein the control circuit may be configured to control the electric motor to drive the cam from the locking rotational position into the unlocking rotational position only in case the radio module receives an authentication signal. For example, the radio module may be configured to receive the authentication signal from a mobile opening device, in particular a smartphone, of the authorized user.

In particular in embodiments in which an unlocking command may be transmitted by pressing the hoop into the lock body, it may be ensured by such an additional authentication signal that only the authorized user may open the lock. However, in such embodiments, the authentication signal may in particular comprise a device identification of an opening device of the user, in particular a smartphone, so that the unlocking command transmitted by pressing the hoop may in particular be executed if there is a connection to the known opening device, for example a Bluetooth connection between the radio module of the padlock and the opening device of the user, without the user having to enter his own unlocking command at the opening device.

Alternatively or additionally, provision may, however, also be made that an unlocking command may be transmitted directly from the mobile opening device to the radio module of the lock in order to open the lock. For example, such an unlocking command may be selectable in an app of a smartphone of the user of the padlock and may be transmittable via the app to the padlock, wherein the control circuit may be configured to control the electric motor to drive the cam into the unlocking rotational position as a result of an unlocking command received at the radio module.

In some embodiments, the control circuit may be configured to control the electric motor to drive the cam into the removal rotational position in response to a release command received at the radio module. In particular, in order to remove the hoop, it may thus be necessary to transmit a unique release command to the radio module so that the hoop may generally always be held at the lock body during normal operation and may only be releasable from the lock body in response to a unique release command. The release command may in particular also be selectable in an app on an opening device of the user.

In some embodiments, the control circuit may be configured to control the electric motor to drive the cam into the locking rotational position in response to a locking command received at the radio module.

In such embodiments, provision may thus be made that a locking may take place solely by the authorized user who may transmit the locking command to the padlock via a corresponding app on a smartphone, for example. The locking command may, for example, also be automatically transmittable in case the radio module is in communication with a known opening device of the user of the padlock so that the cam may in such a case be automatically rotated into the locking rotational position as a result of a movement of the hoop into the locking position, wherein provision may alternatively thereto be made that the locking command must be explicitly transmitted to the radio module.

In other embodiments, provision may, however, also be made that no separate locking command is required to lock the lock, but that the cam may be rotated directly into the locking rotational position when the sensor is contacted by the contact element, in particular at a lower sensor section, after a release. In such embodiments, the padlock may thus generally be locked by any person.

The axis of rotation of the cam may be arranged off-center with respect to the lock body in some embodiments. In such embodiments, the axis of rotation of the cam may in particular not intersect a connection line from the first introduction opening to the second introduction opening that is oriented perpendicular to the axis of rotation. Such an off-center arrangement of the axis of rotation of the cam may in particular also enable an off-center arrangement of the electric motor, whose axis of rotation may correspond to the axis of rotation of the cam or be aligned in parallel with the axis of rotation of the cam, to be able to keep space free for the arrangement of the sensor at a side of the lock body facing away from the axis of rotation of the cam.

In some embodiments, the control circuit may be configured to control the electric motor to drive the cam starting from the unlocking rotational position into the removal rotational position, but not starting from the locking rotational position directly into the removal rotational position. In this regard, provision may be made that the cam, starting from the locking rotational position, must always first be driven into the unlocking rotational position before the cam may be driven into the removal rotational position and the hoop may be released from the lock body.

Such a sequence may in particular be provided in embodiments in which a detent is provided to hold the hoop in the lock body in order, by rotating the cam from the locking rotational position into the unlocking rotational position, to first move the detent from a blocking position into a release position and to release the hoop for a detachment from the lock body. The hoop released by the detent may then be moved against the introduction direction, in particular due to a preload, in order to abut the cam with the holding section and to be held at the lock body. Due to a subsequent rotation of the cam into the removal rotational position, the detent may indeed snap back into the blocking position, but may not again enter into engagement with the hoop moved axially relative to the detent so that the hoop may be released both by the detent and by the cam for a detachment from the lock body. If, on the other hand, the cam was rotated directly from the locking rotational position into the removal rotational position in such embodiments, the hoop would still be held in the lock body by the detent so that a detachment of the hoop from the lock body would be impossible.

The lock body may, in some embodiments, comprise a measurement device for measuring the rotational position of the cam. The measurement device may in particular be connected to the control circuit. In this regard, in some embodiments, the measurement device may directly inform the control circuit of the rotational position of the cam, wherein the signals of the measurement device may in particular be considered in addition to signals of the sensor already mentioned.

In some embodiments, the lock body may comprise an energy source for supplying electrical energy to the control circuit and/or the electric motor and/or the sensor. Such an electrical energy source may in particular be a battery and/or a rechargeable battery. The energy source may in particular also be provided to supply electrical energy to said radio module.

The sensor mentioned may, for example, comprise a mechanical contact switch and/or a capacitive proximity switch and/or an inductive sensor. Furthermore, the control device may in particular comprise a microprocessor and/or a CPU (central processing unit).

The invention further relates to an electronic padlock comprising a lock body and at least one hoop that may be selectively introduced into the lock body and locked in the lock body in a closed position or released for a movement relative to the lock body from the closed position into an open position, wherein the lock body comprises an electromechanical locking device comprising a cam rotatable about an axis of rotation and an electric motor for driving the cam; and a control circuit. Furthermore, the introduced hoop may be locked in the closed position by rotating the cam into a locking rotational position and may be released for a movement into the open position by rotating the cam into an unlocking rotational position, and the control circuit is configured to control the electric motor to selectively drive the cam into the locking rotational position or the unlocking rotational position. According to this aspect of the invention, the lock body furthermore comprises a detent for holding the hoop introduced into the lock body in a locking position, wherein the cam may be rotated from the unlocking rotational position into the locking rotational position when the hoop is held in the locking position.

As already explained above, it may be ensured by such a detent that the cam may be moved trouble-free from the unlocking rotational position into the locking rotational position. In this regard, a detent also enables a reliable and safe handling and control of the padlock, in particular even when the hoop is preloaded towards the open position, irrespective of whether the cam may further be rotated into a removal rotational position and the hoop may be completely released from the lock body. This may moreover be achieved both in embodiments in which the cam, as explained above, locks the hoop directly by engaging into a locking notch and in embodiments in which an intermediate element drivable by the cam, for example a latch, is provided that engages into a locking notch to lock the hoop and that is released by the cam for a radially inwardly directed movement when the cam is positioned in the unlocking rotational position and the hoop is to be released from the lock body.

The detent may generally be configured as already explained above for the electronic padlock comprising a cam that is in particular rotatable into a removal rotational position and engages directly into a locking notch of a first introduction section of a hoop in the locking rotational position, and/or like the contact element for contacting a sensor described in this respect, wherein, however, such a sensor, a direct engagement of the cam into a locking notch, and a removal rotational position according to the aspect of the invention described here do not necessarily have to be provided, but may be.

The hoop introduced into the lock body may be preloaded towards the open position in some embodiments. A spring arranged in the lock body may in particular be provided for this purpose.

Furthermore, in some embodiments, in the open position, the hoop may be connected to the lock body or may be completely releasable from the lock body. The hoop may in particular be a U-hoop having a long limb and a short limb, wherein the long limb may be held at the lock body in the unlocking rotational position of the cam and the open position of the hoop and the short limb may be released from the lock body and/or pivotable about the long limb.

In some embodiments, the detent may be movable between a blocking position, in which the detent blocks the hoop against a movement into the open position, and a release position in which the detent releases the hoop for a movement into the open position.

The cam may, in some embodiments, be configured to contact the detent on a rotation from the locking rotational position into the unlocking rotational position and to move the detent from the blocking position into the release position. In particular, as already explained, the cam may for this purpose have an entrainer section that contacts the detent on the rotation from the locking rotational position into the unlocking rotational position.

The detent may be pivotable from the blocking position into the release position in some embodiments. The detent may in particular be pivotable about a pivot axis oriented perpendicular to the axis of rotation of the cam.

In some embodiments, the detent may be movable from the blocking position into the release position by moving the hoop from the open position into the locking position. For this purpose, the detent may in particular have a slanted contact surface that may be contacted as a result of the movement of the hoop from the open position into the locking position so that the detent may pivot from the blocking position into the release position.

The detent may be preloaded towards the blocking position in some embodiments. This may in particular allow the detent to automatically snap into the blocking position and to thereby hold the hoop in the locking position, provided that the detent is released for a movement into the blocking position. A detent movable from the blocking position into the release position by moving the hoop from the open position into the locking position may in particular be configured, when the locking position is reached, to snap into the blocking position due to the preload and to hold the hoop in the locking position.

In some embodiments, the detent may be able to be urged under the cam by moving the hoop from the open position into the locking position. The detent may in particular be able to be urged under the cam when the cam is in the unlocking rotational position. By urging the detent under the cam, the detent may in particular be able to be brought out of contact with an entrainer section of the cam, by means of which the detent may be pivoted into the release position on a rotation of the cam into the unlocking position, to be able to snap into the blocking position due to the preload towards the blocking position and to thereby be able to hold the hoop in the lock body.

The detent may be preloaded against the urging under the cam in some embodiments. Due to such a preload of the detent towards the open position, it may in particular be achieved that the detent may only be urged under the cam by deliberately moving the hoop into the locking position, but may not unconsciously get under the cam and be moved into the blocking position.

The hoop may, in some embodiments, be configured to be moved starting from the open position beyond the closed position into the locking position. In this regard, in some embodiments, the hoop may be introduced further into the lock body in the locking position than in the closed position. As already explained, this may in particular be achieved in that a locking notch of the hoop, into which the cam and/or a latch driven by the cam engages, may have a greater axial extent than the cam or a latch driven by the cam.

The detent may, in some embodiments, be configured to hold the introduced hoop in the closed position when the cam is rotated into the locking rotational position and to hold the introduced hoop in the locking position when the cam is rotated into the unlocking rotational position. A housing of the lock may in particular have a housing abutment which is contacted by the detent when the cam is rotated into the locking rotational position so that the hoop held by the detent is held in the closed position. In the unlocking rotational position of the cam, on the other hand, the detent may be able to be urged under the cam and may axially contact the cam so that the detent and the hoop held by the detent may be further introduced into the lock body along the introduction direction and the hoop may be held in the locking position.

The hoop may, in some embodiments, have a locking notch and the electromechanical locking device may have an engagement section that is configured to engage into the locking notch of the hoop, which is introduced into the lock body, in the locking rotational position of the cam.

In some embodiments, further, the cam may have the engagement section. Alternatively thereto, in other embodiments, provision may be made that the electromechanical locking device has at least one latch that may be driven by the cam and that has the engagement section. In this regard, the locking of the hoop may take place directly by the cam in some embodiments, but by a latch drivable by the cam in other embodiments.

The extent of the locking notch along the axis of rotation of the cam may, in some embodiments, be greater than the extent of the engagement section along the axis of rotation of the cam.

In some embodiments, the engagement section may, in the closed position of the hoop, contact a lower boundary surface of the locking notch with respect to the introduction direction of the hoop into the lock body when the cam is rotated into the locking rotational position. In this regard, the engagement section may lock the hoop, whereas no force transmission to the detent may take place if, for instance, tensile forces are exerted on the hoop.

The hoop moved into the locking position may, in some embodiments, be transferable from the locking position into the closed position by rotating the cam from the unlocking rotational position into the locking rotational position. In particular, this may take place due to a preloading of the hoop and/or the detent towards the open position in that the detent may, by rotating the cam into the locking rotational position, be released by the cam for an axial movement towards the open position.

In some embodiments, the detent may therefore be movable together with the hoop during the movement of the hoop from the locking position into the closed position.

In some embodiments, the hoop introduced into the lock body may be held at the lock body in the unlocking position and may be releasable for a complete detachment from the lock body by rotating the cam into a removal rotational position, wherein the control circuit may be configured to selectively control the electric motor to drive the cam into the removal rotational position. In some embodiments, the detent may be arranged in the blocking position when the hoop is removed, wherein the detent may be configured to be moved into the release position by the hoop during a movement of the removed hoop into the locking position to allow an introduction of the hoop and, before or upon reaching the locking position, to return to the blocking position and to hold the hoop in the locking position. The detent may also be configured to be moved into the release position by the hoop during a movement of the removed hoop into the closed position and, before or upon reaching the closed position, to return to the blocking position in order to hold the hoop in the closed position. A trouble-free rotation of the cam into the locking rotational position may also be ensured by such a holding of the hoop in the closed position. A holding in the closed position may in particular be provided in embodiments in which the detent may be urged under the cam by moving the hoop into the locking position when the cam is arranged in the unlocking rotational position, but in which the detent is not restricted with respect to axial movements by the cam when the cam is positioned in the removal rotational position.

Furthermore, as already explained above, the lock body may have a sensor, wherein the detent may be configured to contact the sensor when the cam is in the locking rotational position and to release the sensor when the cam is in the unlocking rotational position. In this regard, the detent may have one or more features of the above-explained contact element and the sensor may also have one or more features of the above-explained sensor. The hoop may also generally be configured as explained above and the lock body may have a first introduction opening and a second introduction opening for introducing respective introduction sections of the hoop.

Thus, in summary, the invention may in particular be realized as one of the following embodiments:

Embodiment 1

An electronic padlock, comprising a lock body and at least one hoop that can be selectively locked to the lock body or released from the lock body, and wherein the lock body comprises: a first introduction opening for introducing a first introduction section of the at least one hoop and a second introduction opening for introducing a second introduction section of the at least one hoop into the lock body; an electromechanical locking device comprising a cam rotatable about an axis of rotation and an electric motor for driving the cam; and a control circuit, wherein the first introduction section of the at least one hoop and the second introduction section of the at least one hoop are connected to one another by a connection section and can be introduced along an introduction direction into the first introduction opening and the second introduction opening, wherein the first introduction section has a lower holding section with respect to the introduction direction and an upper locking notch, wherein the cam is configured, in a locking rotational position, to engage into the upper locking notch of the first introduction section and to lock the hoop to the lock body;

in an unlocking rotational position, to release the upper locking notch and to hold the first introduction section at the lower holding section; and in a removal rotational position, to release the lower holding section of the first introduction section and to thereby release the hoop for a complete detachment from the lock body, and wherein the control circuit is configured to control the electric motor to selectively drive the cam into the locking rotational position, the unlocking rotational position or the removal rotational position.

Embodiment 2

An electronic padlock according to embodiment 1, wherein the second introduction section can be released from the lock body in the unlocking rotational position of the cam.

Embodiment 3

An electronic padlock according to embodiment 1 or 2, wherein the cam has: a first locking section that projects radially outwardly with respect to the axis of rotation and that is configured to engage into the upper locking notch in the locking rotational position of the cam; a blocking section that is radially inwardly offset relative to the first locking section and that is configured to come into contact with the lower holding section of the first introduction section in the unlocking rotational position of the cam; and a release section that is radially inwardly offset relative to the blocking section and that is oriented towards the first introduction opening in the removal rotational position.

Embodiment 4

An electronic padlock according to any one of embodiments 1 to 3, wherein the cam, starting from the locking rotational position, can be moved into the unlocking rotational position by a rotation along a first rotational direction and can be moved into the removal rotational position by a rotation along a second rotational direction opposite the first rotational direction.

Embodiment 5

An electronic padlock according to any one of embodiments 1 to 4, wherein the cam can be moved, starting from the locking rotational position, into the unlocking rotational position by a rotation about less than 45 degrees, in particular by a rotation about 30 degrees or less than 30 degrees; and/or wherein the cam can be moved, starting from the locking rotational position, into the removal rotational position by a rotation about less than 45 degrees, in particular by a rotation about 30 degrees or less than 30 degrees; and/or wherein the cam can be moved, starting from the unlocking rotational position, into the removal rotational position by a rotation about less than 90 degrees, in particular by a rotation about 60 degrees or less than 60 degrees.

Embodiment 6

An electronic padlock according to any one of embodiments 1 to 5, wherein the lock body has—in a transverse direction oriented perpendicular to the introduction direction and perpendicular to a connection line between the first introduction opening and the second introduction opening—a maximum extent that is smaller than a maximum extent of the cam in a plane oriented perpendicular to the introduction direction.

Embodiment 7

An electronic padlock according to any one of embodiments 1 to 6, wherein the upper locking notch is rectangular in cross-section and has a planar boundary surface that is configured to contact a planar abutment surface of the cam when the hoop is locked to the lock body.

Embodiment 8

An electronic padlock according to any one of embodiments 1 to 7, wherein the second introduction section has a further locking notch, and wherein the cam is configured to engage into the further locking notch in the locking rotational position and to release the further locking notch in the unlocking rotational position.

Embodiment 9

An electronic padlock according to any one of embodiments 1 to 8, wherein the holding section is formed by a peripheral radial widening of the first introduction section, wherein the holding section is in particular formed at a lower end section of the first introduction section.

Embodiment 10

An electronic padlock according to any one of embodiments 1 to 9, wherein the lock body further has a preloading element that is configured to preload the hoop, which is introduced into the lock body, against the introduction direction.

Embodiment 11

An electronic padlock according to embodiment 10, wherein the lock body comprises a detent for the hoop that is configured to hold the hoop, which is introduced into the lock body, against the preload in the lock body in a locking position in which the cam can be rotated into the locking rotational position.

Embodiment 12

An electronic padlock according to embodiment 11, wherein the cam is configured to contact the detent on a rotation from the locking rotational position into the unlocking rotational position and to move the detent into a release position in which the detent releases the hoop for a detachment from the lock body.

Embodiment 13

An electronic padlock according to any one of embodiments 1 to 12, wherein the lock body comprises a sensor that is configured to detect when the hoop is located in the lock body in a locking position in which the hoop can be locked to the lock body and to detect when the first introduction section is held at the holding section by the cam positioned in the unlocking rotational position, and wherein the sensor is configured to transmit respective detection signals to the control circuit.

Embodiment 14

An electronic padlock according to embodiment 13, wherein the lock body has a contact element that is configured to contact the sensor when the hoop is in the locking position and to release the sensor when the hoop is held at the holding section by the cam.

Embodiment 15

An electronic padlock according to embodiment 14, wherein the contact element is arranged in alignment with the first introduction opening.

Embodiment 16

An electronic padlock according to embodiment 14 or 15, wherein the contact element is preloaded towards the sensor and can be pivoted against the preload by introducing the hoop that is released from the lock body into the lock body.

Embodiment 17

An electronic padlock according to any one of the embodiments 14 to 16, wherein the contact element is configured to hold the hoop, which is in the locking position, in the lock body.

Embodiment 18

An electronic padlock according to any one of the embodiments 14 to 17, wherein the contact element is pivotable, and wherein the cam is configured to pivot the contact element with an entrainer section on a rotation from the locking rotational position into the unlocking rotational position and to thereby release the contact of the contact element to the sensor.

Embodiment 19

An electronic padlock according to embodiment 18, wherein the contact element is preloaded towards the sensor, wherein the contact element can be urged under the entrainer section by moving the hoop along the introduction direction into the locking position, and wherein the contact element urged under the entrainer section is configured, as a result of the preload, to pivot towards the sensor and to contact the sensor.

Embodiment 20

An electronic padlock according to any one of the embodiments 14 to 19, wherein the control circuit is configured to control the electric motor to drive the cam from the unlocking rotational position into the locking rotational position in case the contact element first releases the sensor and then contacts the sensor.

Embodiment 21

An electronic padlock according to any one of the embodiments 14 to 20, wherein the sensor has an upper sensor section and a lower sensor section and is configured to transmit a first detection signal to the control circuit when the upper sensor section is contacted and to transmit a second detection signal to the control circuit when the lower sensor section is contacted.

Embodiment 22

An electronic padlock according to embodiment 21, wherein the contact element is preloaded towards the upper sensor section.

Embodiment 23

An electronic padlock according to embodiment 21 or 22, wherein the control circuit is configured to control the electric motor to drive the cam from the unlocking rotational position into the locking rotational position in case the contact element first releases the sensor and then contacts the sensor at the lower sensor section.

Embodiment 24

An electronic padlock according to any one of the embodiments 21 to 23, wherein the contact element is configured to contact the sensor at the upper sensor section as a result of a movement of the cam from the unlocking rotational position into the removal rotational position.

Embodiment 25

An electronic padlock according to embodiment 24, wherein the control circuit is configured to control the electric motor to drive the cam from the removal rotational position into the locking rotational position in case the sensor, after a transmission of the first detection signal, is released by the contact element and is then contacted again.

Embodiment 26

An electronic padlock according to any one of the embodiments 21 to 25, wherein the contact element is configured to contact the sensor at the upper sensor section when the hoop is locked to the lock body.

Embodiment 27

An electronic padlock according to embodiment 26, wherein the locked hoop can be moved along the introduction direction, and wherein the contact element is configured to contact the sensor at the lower sensor section as a result of a movement of the locked hoop along the introduction direction, wherein the control circuit is configured to control the electric motor to drive the cam from the locking rotational position into the unlocking rotational position in case the sensor first transmits the first detection signal and then transmits the second detection signal.

Embodiment 28

An electronic padlock according to any one of the embodiments 1 to 27, wherein the lock body further has a radio module for receiving control signals, wherein the control circuit is configured to control the electric motor to drive the cam from the locking rotational position into the unlocking rotational position only in case the radio module receives an authentication signal.

Embodiment 29

An electronic padlock according to embodiment 28, wherein the control circuit is configured to control the electric motor to drive the cam into the removal rotational position in response to a release command received at the radio module.

Embodiment 30

An electronic padlock according to embodiment 28 or 29, wherein the control circuit is configured to control the electric motor to drive the cam into the locking rotational position in response to a locking command received at the radio module.

Embodiment 31

An electronic padlock according to any one of the embodiments 1 to 30, wherein the axis of rotation of the cam is arranged off-center with respect to the lock body.

Embodiment 32

An electronic padlock according to any one of the embodiments 1 to 31, wherein the control circuit is configured to control the electric motor to drive the cam starting from the unlocking rotational position into the removal rotational position, but not starting from the locking rotational position directly into the removal rotational position.

Embodiment 33

An electronic padlock according to any one of the embodiments 1 to 32, wherein the lock body comprises a measurement device for measuring the rotational position of the cam.

DESCRIPTION OF THE DRAWINGS

The invention will be explained in the following purely by way of example with reference to an embodiment and to the drawings.

There are shown.

DESCRIPTION OF THE INVENTIONS

Figure 1:
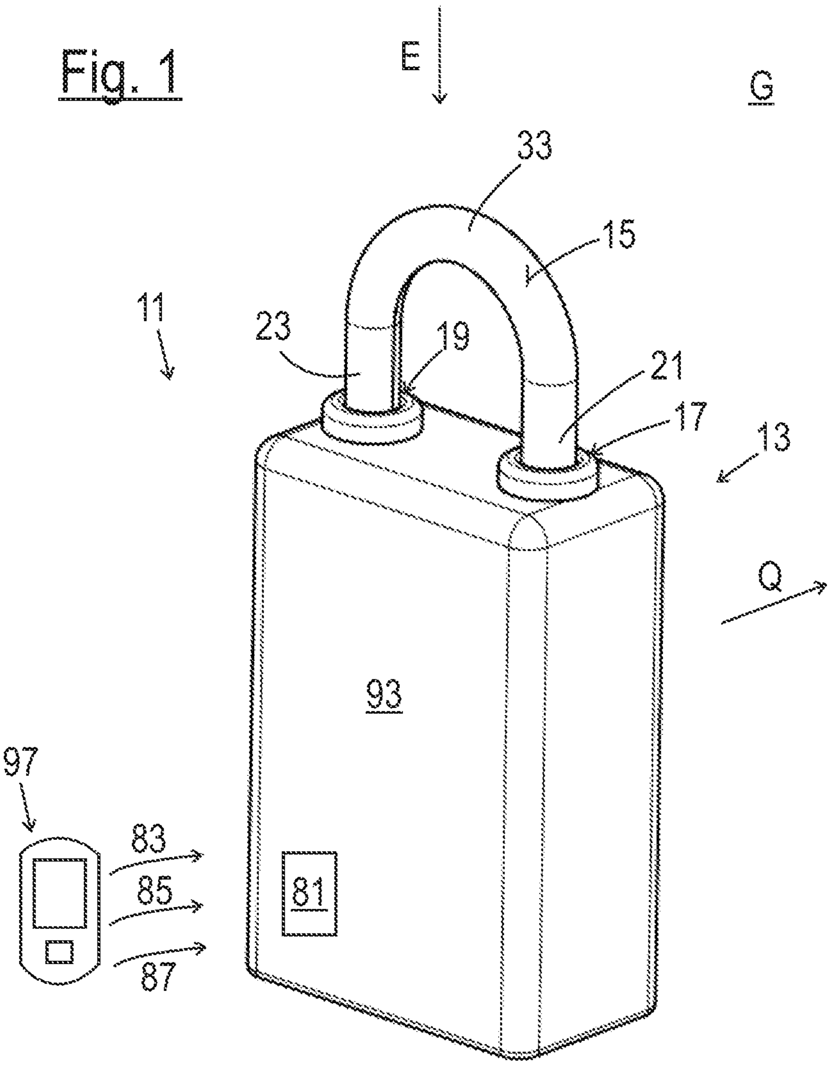
FIG. 1 is a schematic external view of an electronic padlock with a lock body and a hoop.
Figure 10A:
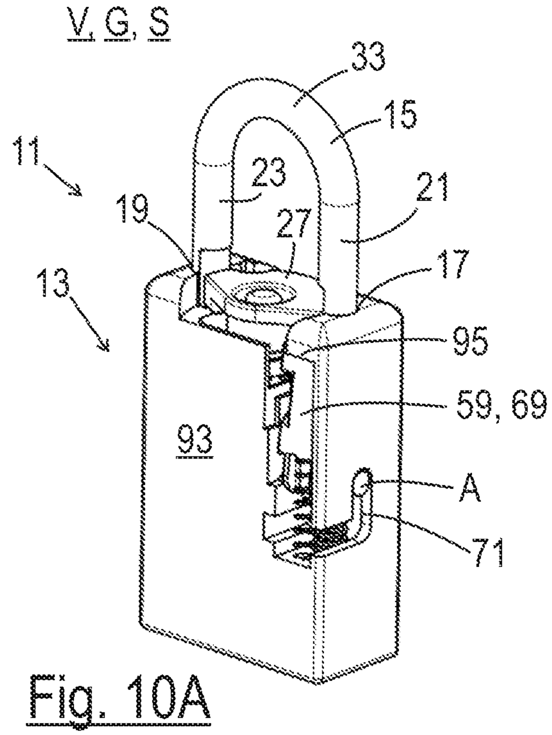
FIGS. 10A to 10E are respective representations of the padlock with the housing partly shown, wherein the cam is in the locking position, in the unlocking position with the hoop partly released, in the removal rotational position with the hoop removed, in the removal rotational position with the hoop introduced, and in the unlocking position with the hoop introduced.
Figure 10B:
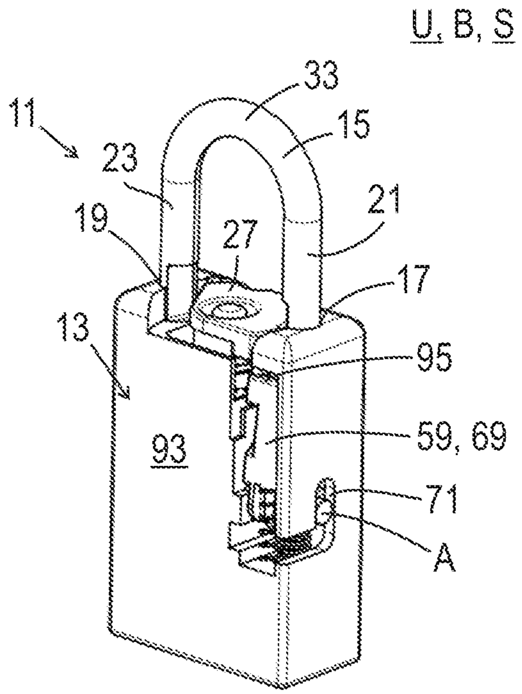
Figure 10C:
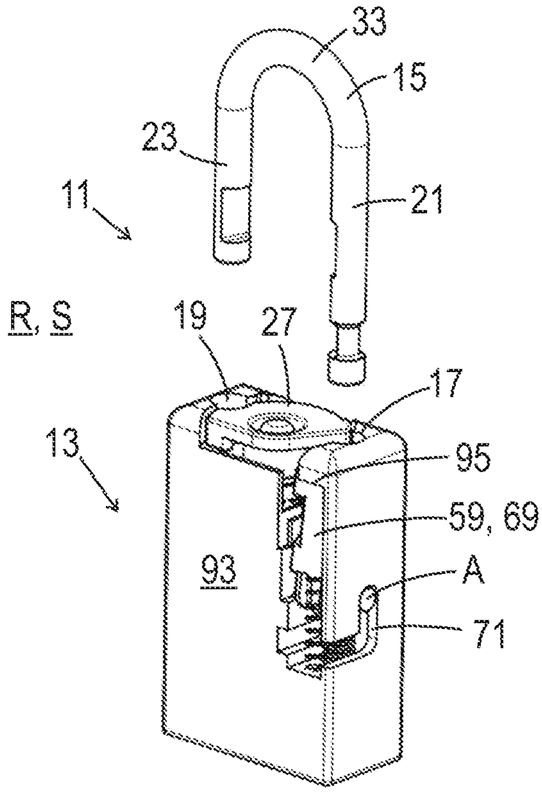
Figure 10D:
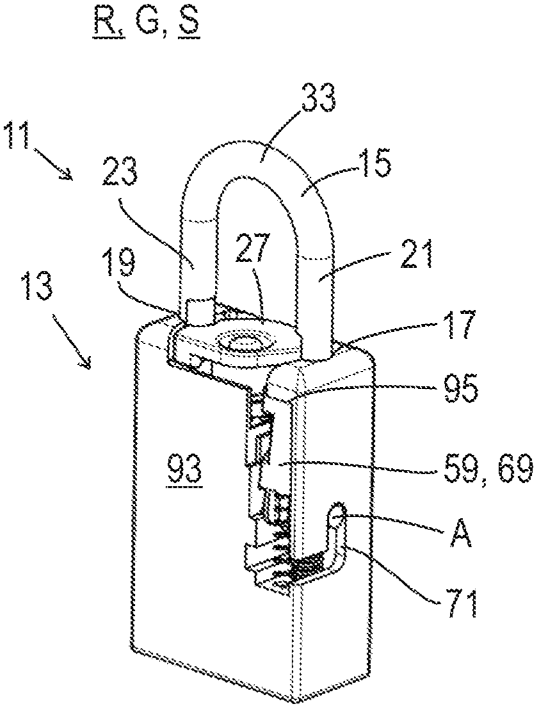
Figure 10E:
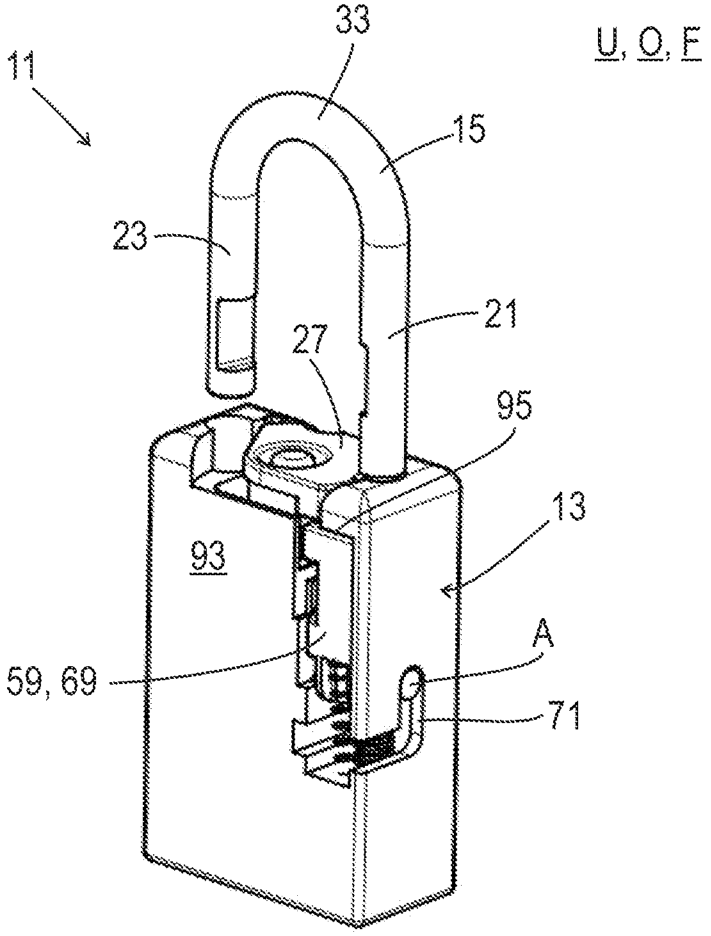

FIG. 1 shows an electronic padlock 11 comprising a lock body 13 and a hoop 15 that is introduced into the lock body 13, that is in a closed position G and that may be selectively locked to the lock body 13 in the closed position G or released for a detachment from the lock body 13 and a transfer into an open position O (cf. also FIG. 10E). In the closed position G shown in FIG. 1, a first introduction section 21 of the hoop 15 is introduced into a first introduction opening 17 of the lock body 13 and a second introduction section 23 of the hoop 15 is introduced into a second introduction opening 19 of the lock body 13, wherein the first introduction section 21 and the second introduction section 23 of the hoop 15 are connected to one another by a connection section 33 so that the lock body 13 and the hoop 15 form a closed loop in the closed position G of the hoop 15, for instance, to be able to secure a hasp. In this respect, the introduction openings 17 and 19 are formed as openings at a housing 93 of the padlock 11 into which the introduction sections 21 and 23 may be introduced along an introduction direction E.

To be able to selectively open the padlock 11 and release the hoop 15 for a detachment from the lock body 13, the padlock 11 comprises an electromechanical locking device 25 explained in more detail below. Furthermore, the padlock 11 has a radio module 81 to receive an authentication signal 83, a release command 85 and/or a locking command 87 from a mobile opening device 97, in particular a smartphone, of a user of the padlock 11 for actuating the electromechanical locking device 25. This is also explained in more detail below.

As can be seen from FIGS. 2A to 10E, the electromechanical locking device 25 comprises a cam 27 rotatable about an axis of rotation D, wherein the cam 27 is connected to an electric motor 29 via a gear 30. The electric motor 29 is configured to selectively rotate the cam 27 into a locking rotational position V, an unlocking rotational position U or a removal rotational position R, wherein the electromechanical locking device 25 furthermore comprises a control circuit 31 that is configured to control the electric motor 29 to selectively drive the cam 27 into the locking rotational position V, the unlocking rotational position U or the release rotational position R. The gear 30 may in particular be adapted to transmit a rotation of a motor shaft slowed down to the cam 27 to enable a precise control of the cam 27. Furthermore, the control circuit 31 may be connected to the radio module 81 to be able to consider the authentication signal 83, the release command 85 and/or the locking command 87 in the control of the electric motor 29 and thus of the cam 27. An electrical energy source 91, in particular a battery or a rechargeable battery, is furthermore provided for the energy supply of the electromechanical locking device 25.

FIGS. 2A to 2D show the hoop 15 in the closed position G, wherein the cam 27 is rotated into the locking rotational position V. In the locking rotational position V, the cam 27 engages with a first locking section 39 into an upper locking notch 35 formed at the first introduction section 21 of the hoop 15. Furthermore, the cam 27 engages with a second locking section 41 into a further locking notch 55 formed at the second introduction section 23 so that the hoop 15, which is in the closed position G, is locked to the lock body 13 directly by the engagement of the cam 27 into the locking notches 35 and 55.

The hoop 15 is here configured by way of example as a substantially U-shaped rigid U-hoop 15, with the first introduction section 21 forming a long limb of the U-hoop 15 and the second introduction section 23 forming a short limb of the U-hoop 15. Alternatively thereto, however, in other embodiments, the hoop 15 may, for example, also be configured as a rope hoop or chain hoop, wherein the introduction sections 21 and 23 in such embodiments may be formed by bolts that may be introduced into the lock body 13 and that may be connected to one another by a chain forming the connection section 33 or by a rope forming the connection section 33. Furthermore, a U-hoop having limbs of equal length may be provided.

Since the cam 27 engages into the locking notches 35 and 55 in the locking rotational position V, the hoop 15 may be locked to the lock body 13 directly by the cam 27 without providing any intermediate elements, for example a latch that may be driven by the cam 27 or released for a radially inward movement, that engage into the locking notches 35 and 55. This may in particular enable a reliable locking of the hoop 15 to the lock body 13 in that the cam 27 may in particular be held in the housing 93 in an axially fixed manner so that any tensile forces exerted on the hoop 15 during a break-open attempt may be transmitted from the cam 27 directly to the stable housing 93 of the padlock 11. Furthermore, it can, for example, be seen from FIG. 2C that the locking notches 35 and 55 are rectangular in cross-section and have boundary surfaces 51 that are oriented perpendicular to the introduction direction E and that, in the locking rotational position V, contact an abutment surface 53 of the cam 27 that is likewise oriented perpendicular to the introduction direction E. Due to this design of the locking notches 35 and 55, the cam 27 may hold the hoop 15 in the lock body 13 in a form-fitting manner and any tensile forces applied to the hoop 15 against the introduction direction E may not result in a torque which is exerted on the cam 27 and by which the rotational position of the cam 27 could possibly be changed. Furthermore, due to the direct locking of the hoop 15 by the cam 27, the number of components of the electromechanical locking device 25 may be reduced compared to conventional solutions and the assembly of the padlock 11 may be facilitated.

Figure 2A:
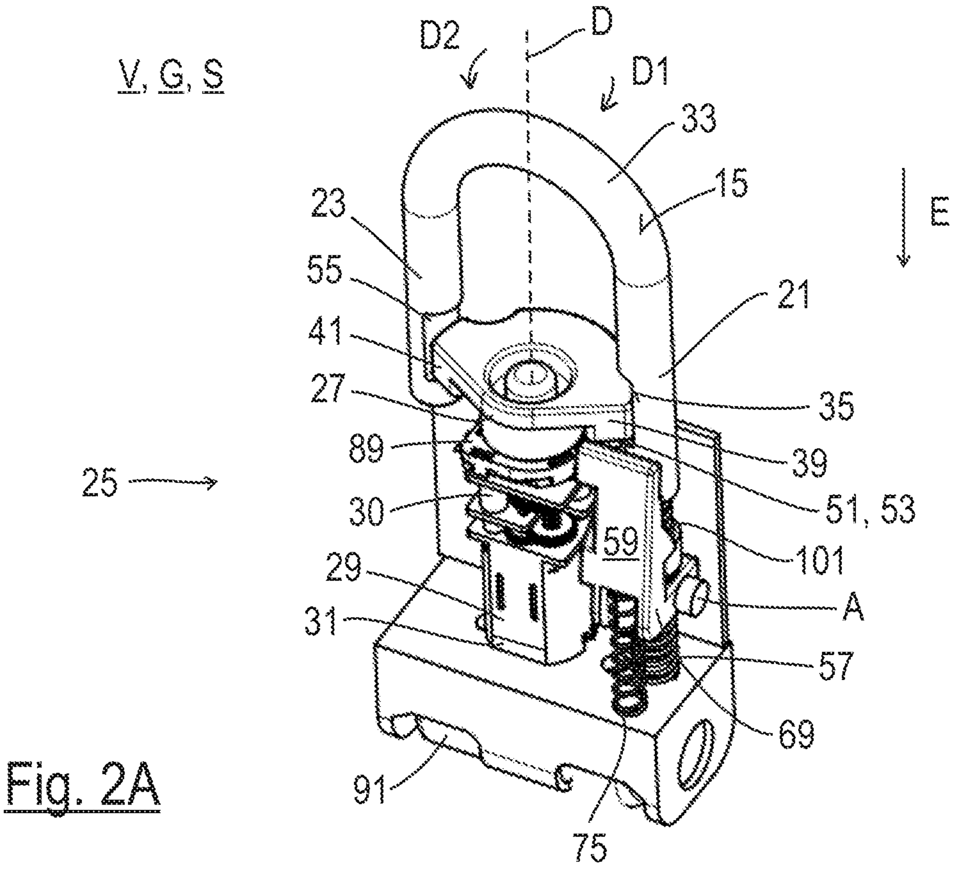
FIGS. 2A to 2D are respective representations of the padlock with the housing removed and the cam rotated into a locking rotational position, said cam locking the hoop to the lock body by engaging into locking notches formed at a first and a second introduction section.
Figure 2B:
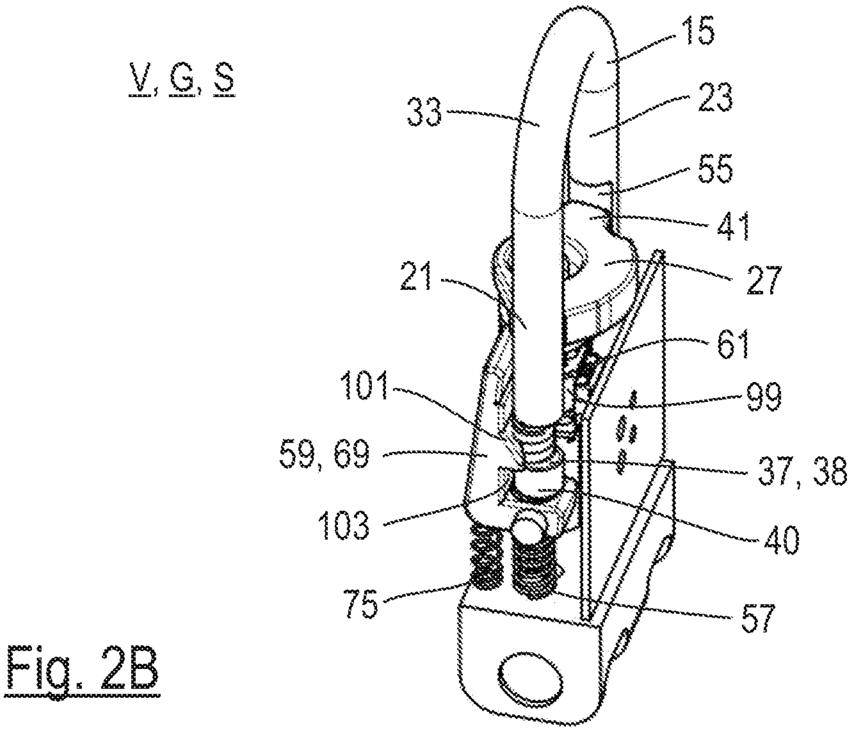
Figure 2C:
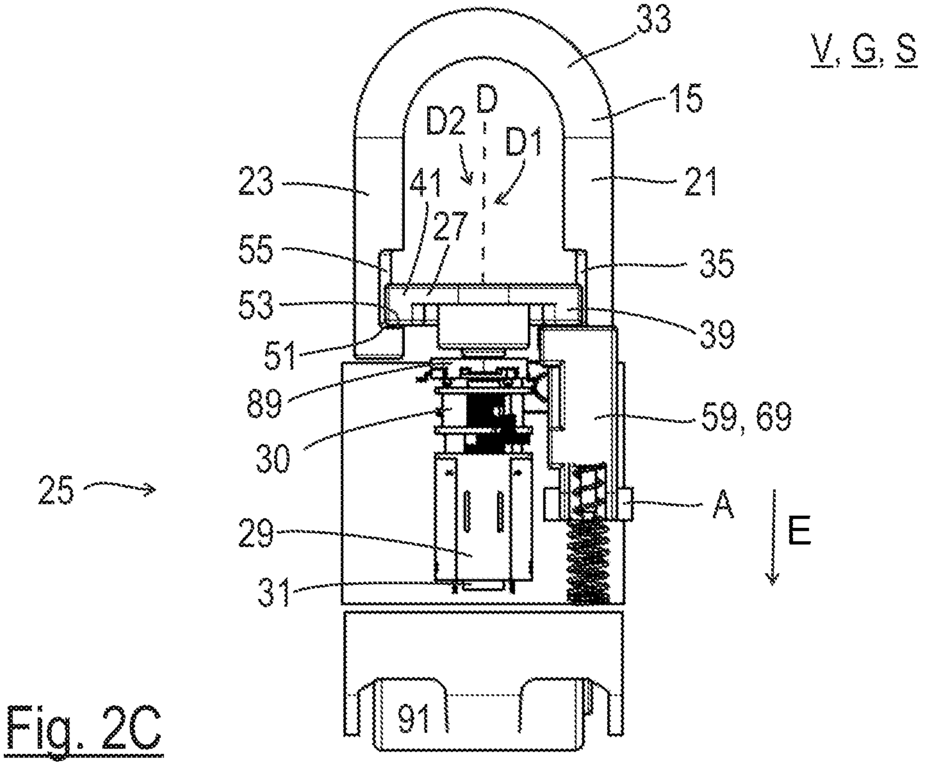
Figure 2D:
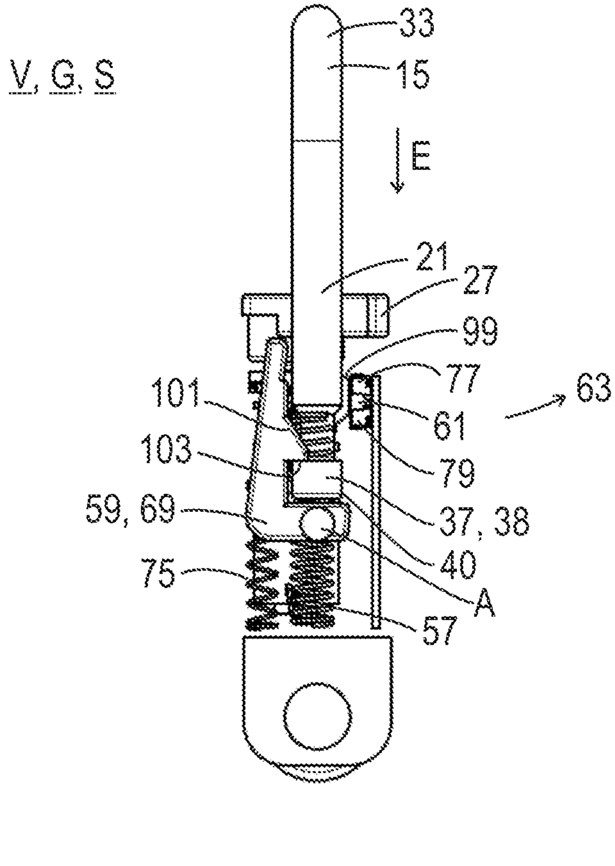

In addition to the locking by the cam 27, it can in particular be seen from FIG. 2D that the first introduction section 21 is held in the lock body 13 at a lower holding section 37, which forms a radial widening 38 at a lower end section 40 of the first introduction section 21, by a detent 59 against a preload developed by a preloading element 57, for example a spring. For this purpose, the detent 59 has a blocking surface 103 that is oriented perpendicular to the introduction direction E and that is contacted by the holding section 37. In this regard, when the hoop 15 is introduced into the lock body 13, the detent 59 is in a blocking position S in which the detent 59 prevents a release of the hoop 15 from the lock body 13 due to the preload developed by the preloading element 57.

Figure 3A:
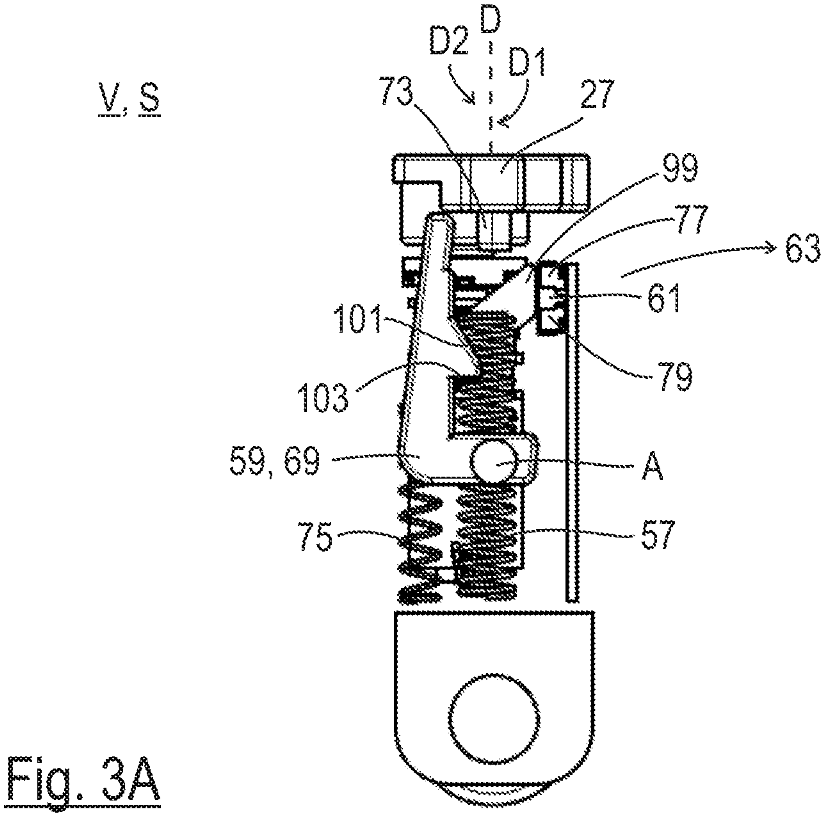
FIGS. 3A and 3B are respective side and top views of the padlock with the hoop not shown and the cam rotated into the locking rotational position.

In addition to holding the hoop 13 in the lock body 13, the detent 59 further functions as a contact element 69 that is configured to contact a sensor 61 with a contact section 99 when the hoop 15 is locked to the lock body 13 (cf. FIG. 2D). This is in particular illustrated by means of FIG. 3A in which the hoop 15 is masked to illustrate the actuation of the sensor 61 by the contact section. As FIG. 3A shows, the sensor 61 has an upper sensor section 77 and a lower sensor section 79, wherein the contact element 69 contacts the upper sensor section 77 with a contact section 99, which extends arm-like towards the sensor 61, when the cam 27 is in the locking rotational position V and the hoop 15 is in the closed position G. The sensor 61 is configured to transmit a first detection signal 63 to the control circuit 31 when the contact element 69 contacts the upper sensor section 77 so that information may be provided to the control circuit 31 regarding which position the contact element 69 is in.

However, to allow a release of the hoop 15 from the lock body 13 and thus an opening of the padlock 11, the detent 59 may be pivoted about a pivot axis A, which is oriented perpendicular to the axis of rotation D of the cam 27, from the blocking position S into a release position F in which the hoop 15 is released by the detent 59 for a detachment from the lock body 13 (cf. FIGS. 4A to 5B). The detent 59 is in this respect preloaded by a preloading element 75, for example again a spring, towards the blocking position S and the contact element 69 formed by the detent 59 is preloaded towards the sensor 61, in particular towards the upper sensor section 77. Furthermore, the axis of rotation D of the cam 27 and the electric motor 29 are arranged off-center with respect to the lock body 13 so that sufficient space for arranging the sensor 61 is available at the side of the lock body 13 facing away from the electric motor 29.

Figure 3B:
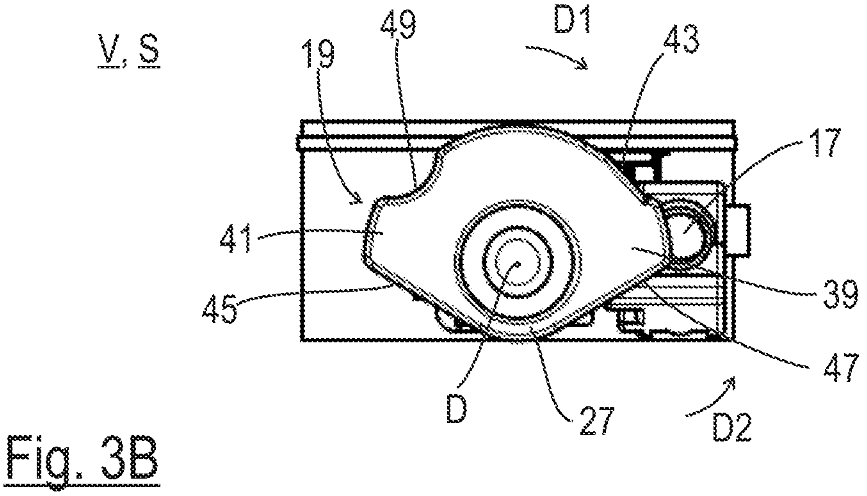

FIG. 3B in particular illustrates the configuration of the cam 27 in a top view, wherein it can be seen that, in the locking rotational position V shown, the first locking section 39 and the second locking section 41 are oriented towards the introduction openings 17 and 19 to be able to engage into the introduction notches 35 and 55 of the introduction sections 21 and 23 introduced into the lock body 13. Since the axis of rotation D is arranged off-center in the lock body 13, the locking sections 39 and 41 are offset from one another by less than 180 degrees with respect to the axis of rotation D. The cam 27 furthermore has a blocking section 43 that is radially inwardly offset relative to the locking section 39, wherein the blocking section 43 may be oriented towards the first introduction opening 17 by rotating the cam 27 along a first direction of rotation D1 in order to thereby allow an unlocking of the hoop 15 (cf. FIG. 5B). Due to the rotation along the first direction of rotation D1, an unlocking section 45 of the cam 27 may furthermore be oriented towards the second introduction opening 19, whereby a complete release of the second introduction section 23 or the short limb of the U-hoop 15 from the lock body 13 may be made possible. This will be explained in more detail below with reference to FIGS. 4A to 5B.

As can already be seen from FIG. 3A, the cam 27 has an entrainer section 73 facing towards the detent 59 or the contact element 69. In case the cam 27 is controlled for a rotation along the first direction of rotation D1 into the unlocking rotational position U, the entrainer section 73 contacts the detent 59 or the contact element 69 so that the detent 59 or the contact element 69 may be pivoted into the release position F against the preload developed by the preloading element 75 and the hoop 15 may thereby be released by the detent 59 for a detachment from the lock body 13 (cf. in particular FIG. 5A).

In particular, due to this pivoting of the detent 59, the blocking surface 103 of the detent 59 may be brought out of engagement with the lower holding section 37 so that the lower holding section 37 may be moved past the detent 59 against the introduction direction E. Due to the preload of the hoop 13 against the introduction direction E, the hoop 13 released by the detent 59 may furthermore be directly urged out of the lock body 13 when the cam 27 is rotated into the unlocking rotational position U without a user having to transmit a force directed against the introduction direction E to the hoop 13.

Figure 4A:
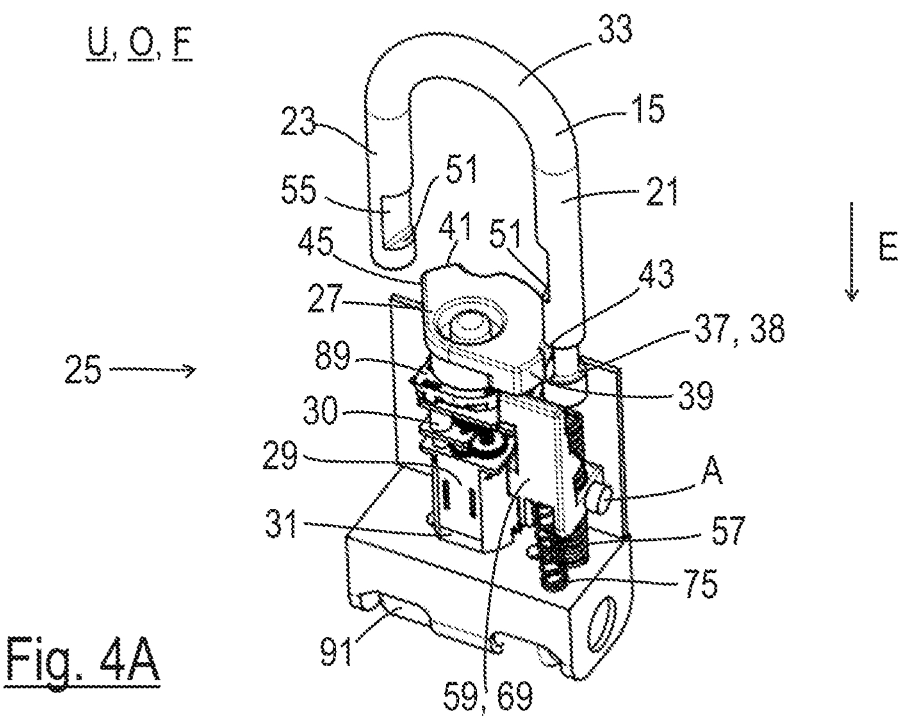
FIGS. 4A to 4D are respective representations of the padlock with the housing removed and the cam rotated into an unlocking rotational position in which the hoop is held at a lower holding section of the first introduction section.
Figure 4B:
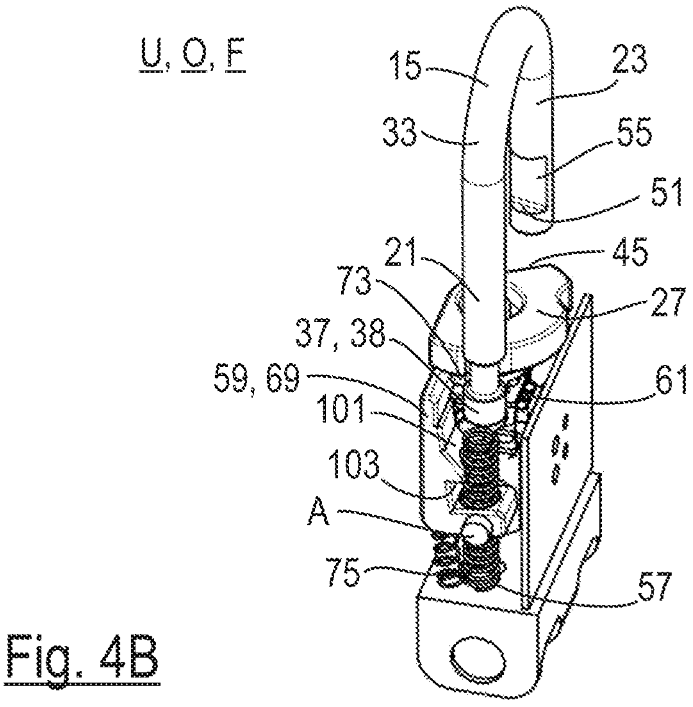
Figure 4C:
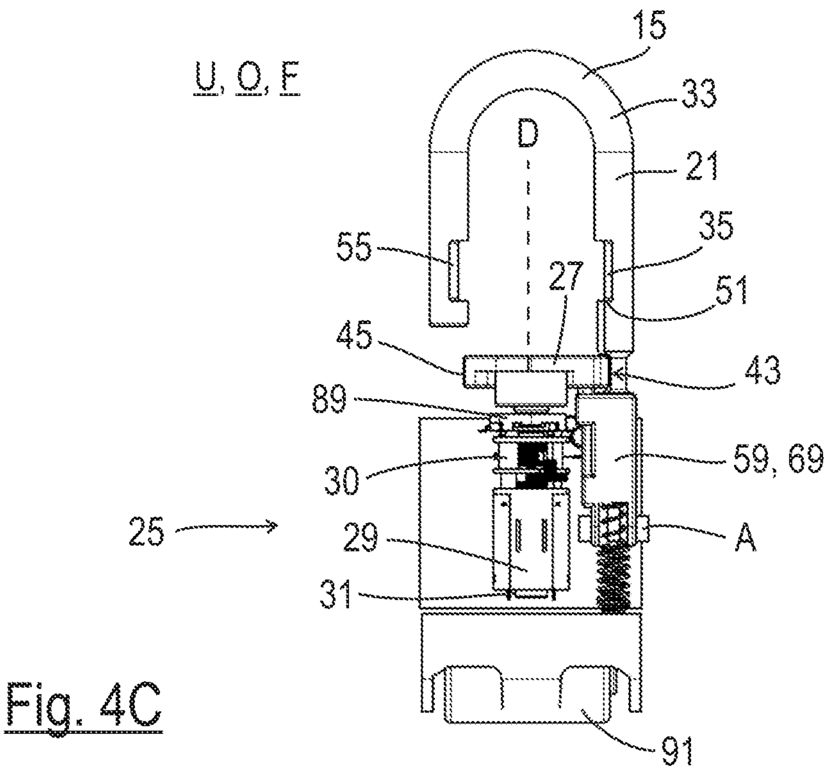
Figure 4D:
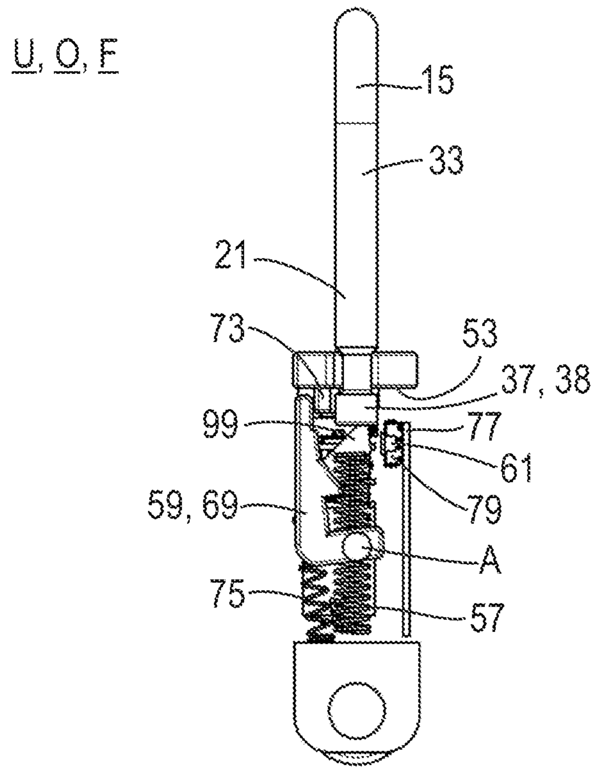

While the detent 59 thus fully releases the hoop in the unlocking rotational position U, the cam 27 is configured to hold the first introduction section 21 at the lower holding section 37 in the unlocking rotational position U and to thereby hold the hoop 15 at the lock body 13 (cf. FIGS. 4A to 4C). The blocking section 43 of the cam 27, which faces towards the first introduction opening 17 in the unlocking rotational position U, in particular has a smaller radial extent than the first locking section 39 for this purpose so that the upper locking notch 35 of the first introduction section 21 is unblocked by the cam 27, but the blocking section 43 engages into the first introduction opening 17 in the unlocking rotational position U (cf. FIG. 5B). The holding section 37, which has a larger radial extent compared to the boundaries of the locking notch 35, therefore abuts the blocking section 43 due to the preload developed by the preloading element 57 so that the first introduction section 21 may not be completely released from the lock body 13 and the hoop 15 is held at the lock body 13 when the cam 27 is rotated into the unlocking rotational position U.

On the other hand, the unlocking section 45 of the cam 27 oriented towards the second introduction opening 19 does not engage into the second introduction opening 19 so that the second introduction section 23 or the short limb of the hoop 15 may be completely released from the lock body 13 in the unlocking rotational position U of the cam 27. This may, for example, allow the hoop 15 to be guided through an eyelet of a hasp to be able to securely block the hasp by subsequently locking the hoop 15 to the lock body 13 without the hoop 15 having to be fully released from the lock body 13 for this purpose. To further facilitate the handling of the padlock 11, the hoop 15 may in particular be pivotable about the long limb or the first introduction section 21, which is held at the lock body 13, in the unlocking rotational position U (cf. also FIG. 10E).

Figure 5A:
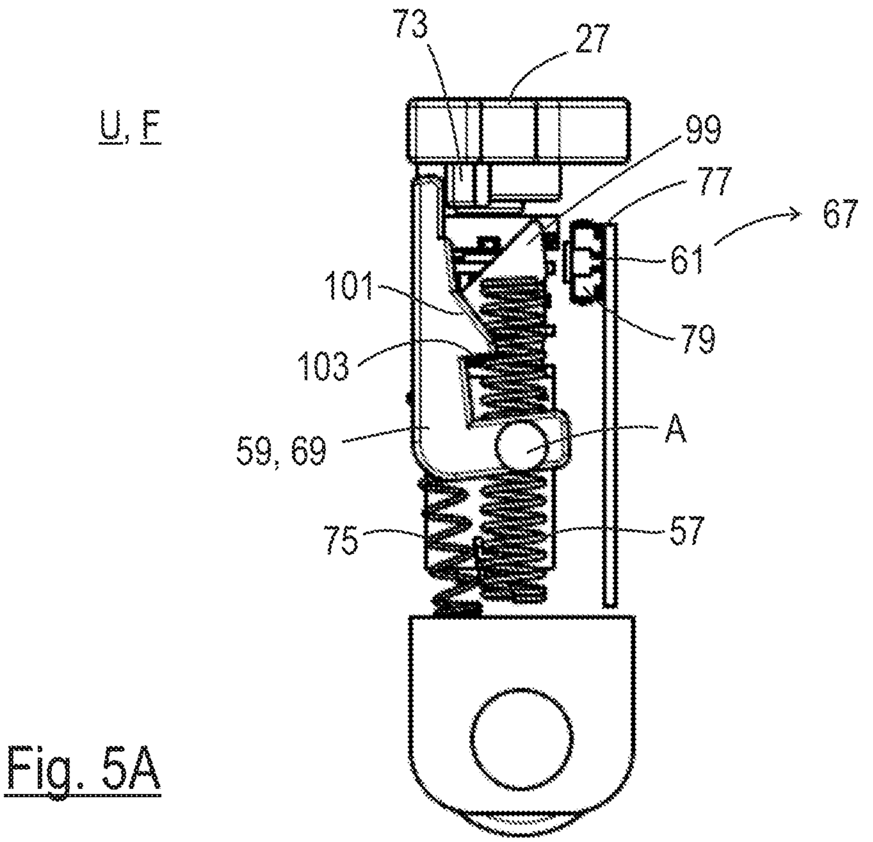
FIGS. 5A and 5B are a side view and a top view with the hoop removed and the cam rotated into the unlocking rotational position.
Figure 5B:
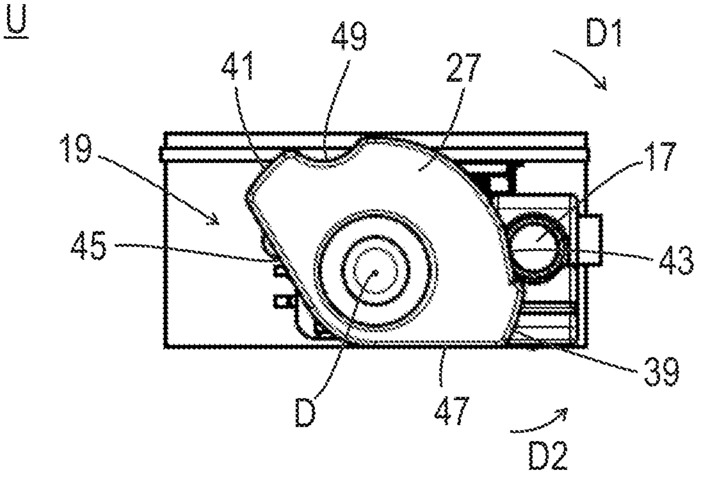

As can furthermore in particular be seen from FIG. 5A, the contact element 69 or its contact section 99 does not contact the sensor 61 when the detent 59 or the contact element 69 is in the release position F and the cam 27 is in the unlocking rotational position U. As a result, the sensor 61 may transmit a release signal 67 to the control circuit 31 so that the sensor 61 may detect that the hoop 15 is held at the lower holding section 37 and is not locked to the lock body 13 in order to transmit a corresponding detection signal, the release signal 67, to the control circuit 31.

As FIGS. 10A to 10E further show, the pivot axis A of the contact element 69 or of the detent 59 is axially guided in a groove 71 with respect to the axis of rotation D at the housing 93 of the padlock 11, wherein a movement of the detent 59 against the introduction direction E is in particular limited by a housing abutment 95 formed at the housing 93. This guidance of the pivot axis A in a groove 71 makes it possible to move the hoop 15, which is in the closed position G and locked, together with the detent 59, which holds the hoop 15, against the preload of the preloading elements 57 and 75 up to and into a locking position B in which the hoop 15 is introduced further into the lock body 13 compared to the closed position G (cf. FIGS. 6A to 7). This movability of the locked hoop 15 allows an unlocking command to be generated and transmitted to the control circuit 31 by pressing the locked hoop 15; consequently, the control circuit 31 may control the electric motor 29 to drive the cam 27 from the locking rotational position V into the unlocking rotational position U.

Figure 7:
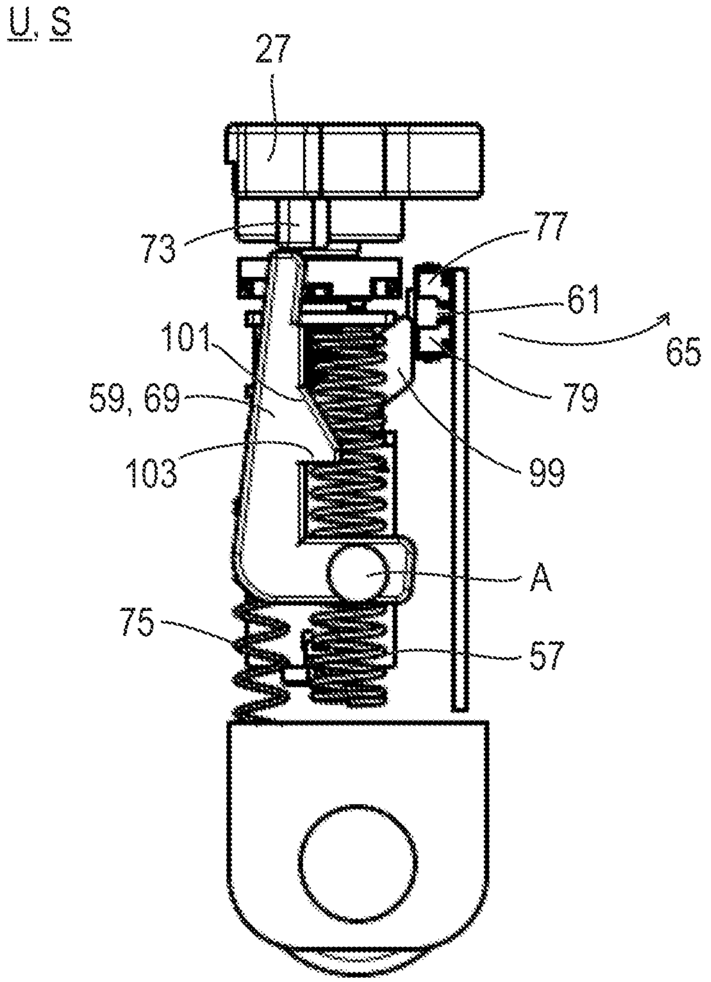
FIG. 7 is a corresponding side view with the hoop removed.

By pressing the hoop 15, the hoop 15 may be moved together with the contact element 69 along the introduction direction E, wherein the contact element 69 may consequently contact the lower sensor section 79 of the sensor 61 (cf. in particular FIG. 7). In this regard, an unlocking command may be detected by the control circuit 31 by the sensor 61 first transmitting the first sensor signal 63 and then transmitting a second sensor signal 65 to the control circuit 31 when the contact element 69 contacts the lower sensor section 79 as a result of a pressing of the hoop 15. To furthermore ensure that the padlock 11 may only be opened by the authorized user, the control circuit 31 may further be configured to rotate the cam 27 into the unlocking rotational position U only when, in addition to the unlocking command transmitted by pressing the hoop 15, the authentication signal 83 is received at the radio module 81 from the mobile opening device 97 shown in FIG. 1. In particular, it may be sufficient for the transmission of the authentication signal 83 that a radio connection, for example a Bluetooth connection, exists between the mobile opening device 97 and the radio module 81 so that the authorized user, for instance, only has to move with his mobile opening device 97, in particular a smartphone, in the vicinity of the padlock 11 and has to press the hoop 15 into the lock body 13 to be able to open the padlock 11.

Figure 6A:
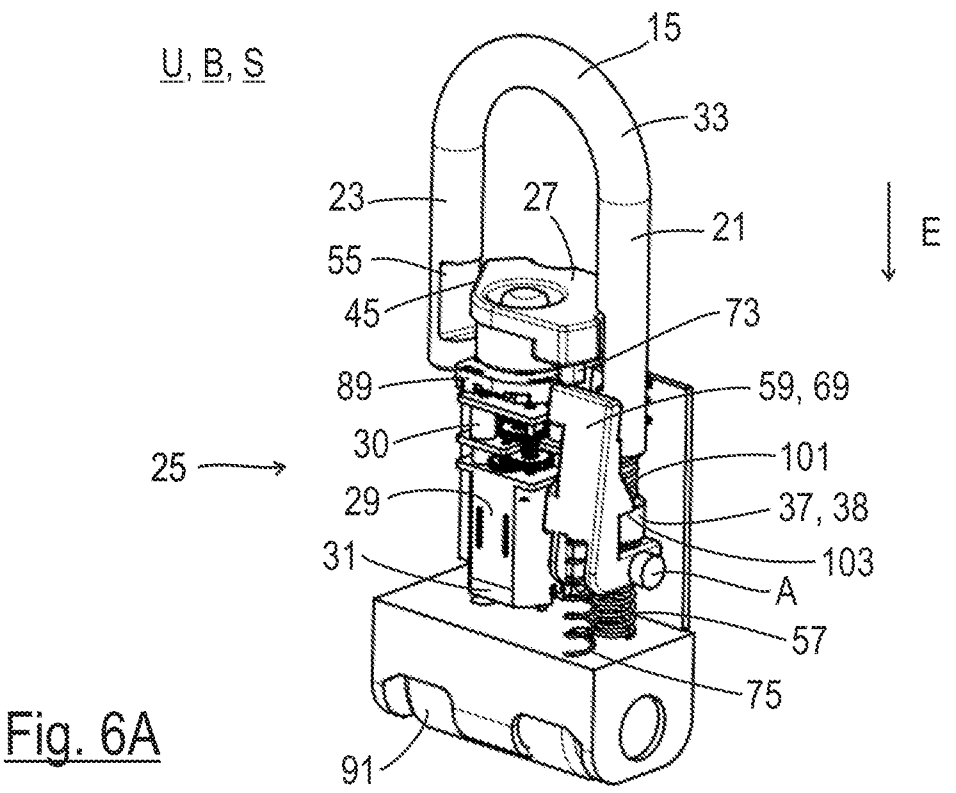
FIGS. 6A to 6D are respective representations of the padlock with the housing removed and the cam rotated into the unlocking rotational position, wherein the hoop is, however, moved into a locking position in which the cam is movable into the locking rotational position.
Figure 6B:
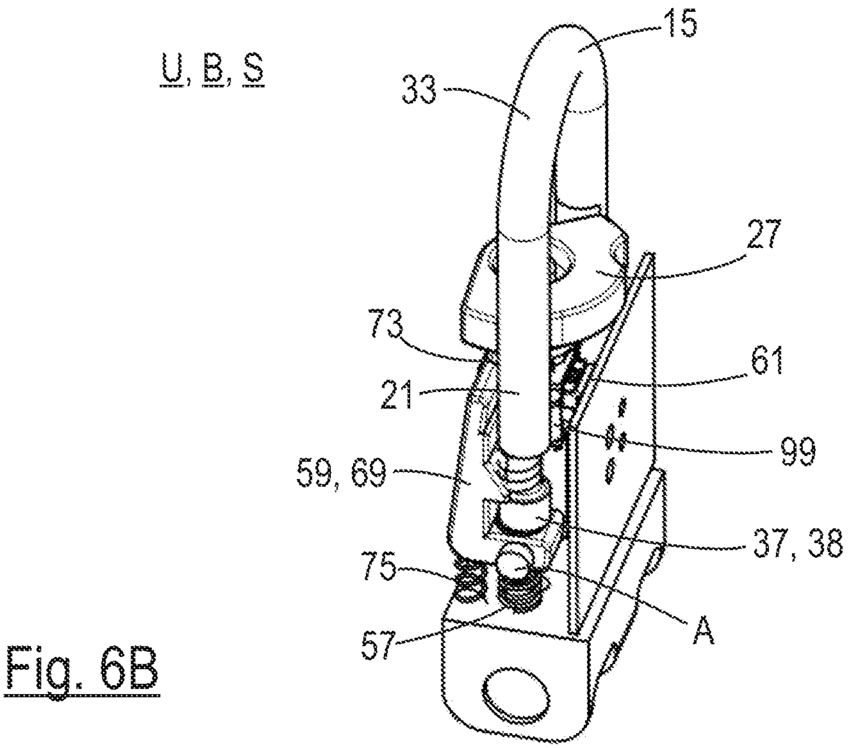
Figure 6C:
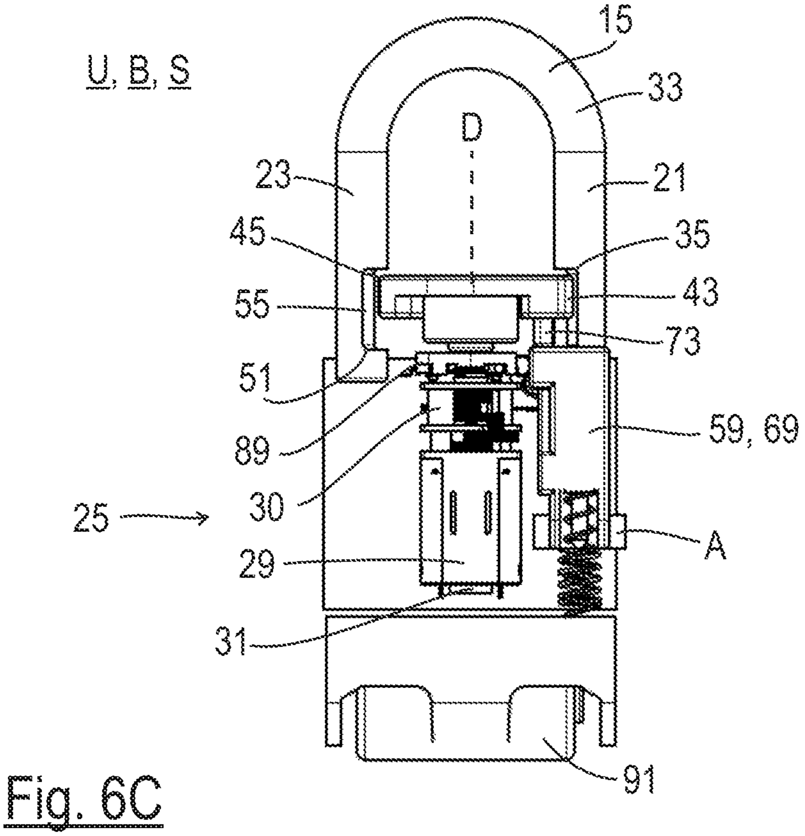
Figure 6D:
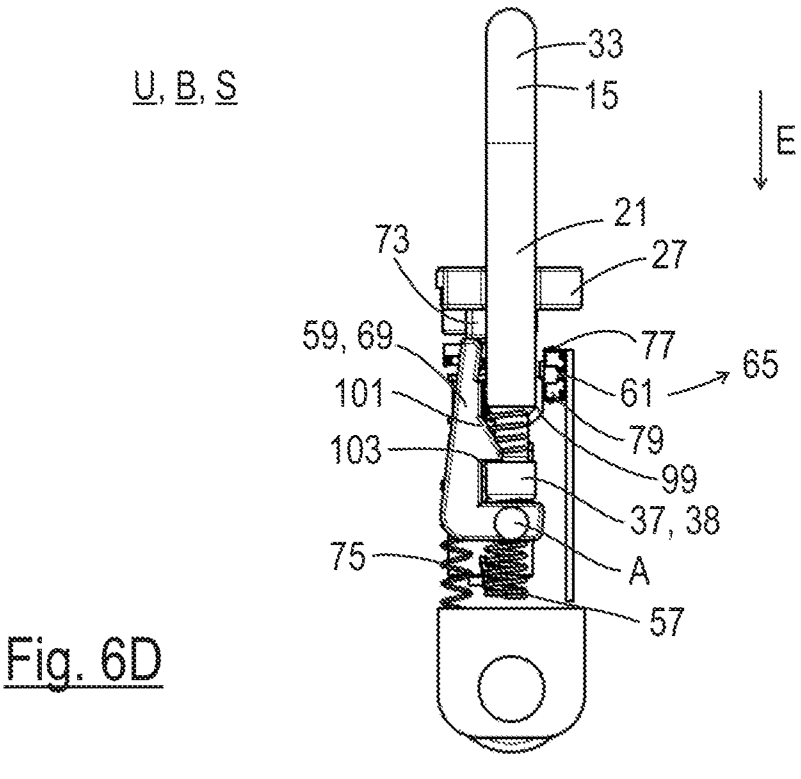

In addition to transmitting an unlocking command, the axial movability of the detent 59 or the contact element 69 also enables the hoop 15, which has been released from the lock body 13, to be held in the locking position B after an introduction into the lock body 13, in which locking position B the cam 27 may be rotated trouble-free from the unlocking rotational position U into the locking rotational position V. FIGS. 6A to 7 illustrate a position of the hoop 15 and the detent 59 after the hoop 15 and in particular its second introduction section 23 have been reintroduced into the lock body 13, wherein the cam 27 is in the unlocking rotational position U. As can in particular be seen from FIGS. 6D and 7, the detent 59 or the contact element 69 may be urged under the cam 27 as a result of the introduction of the hoop 15 in that the introduced hoop 15 moves the detent 59 or the contact element 69 against the preload of the preloading elements 57 and 75 along the introduction direction E. As soon as the detent 59 or the contact element 69 moves under the entrainer section 73 of the cam 27, the detent 59 or the contact element 69 is released for a movement into the blocking position S so that the detent 59 or the contact element 69 pivots into the blocking position S due to the preload developed by the preloading element 75 and engages over the holding section 37 with the blocking surface 103 to hold the hoop 15 in the locking position B, in which the locking notches 35 and 55 are arranged at the same level as the locking sections 39 and 41 of the cam 27, so that the cam 27 may rotate trouble-free from the unlocking position U into the locking rotational position V.

Since the detent 59 or the contact element 69 is arranged below the cam 27 when the hoop 15 is moved into the locking position B, the hoop 15 so-to-say has to be moved beyond the closed position G along the introduction direction E to reach the locking position B. Furthermore, the locking notches 35 and 55 have a greater extent than the cam 27 in an axial direction with respect to the axis of rotation D of the cam 27 so that the cam 27 may engage into the locking notches 35 and 55 with the locking sections 39 and 41 both when the hoop 15 is in the closed position G and when the hoop 15 is in the locking position V.

Furthermore, in particular FIG. 7 shows that the contact element 69 urged under the cam 27 contacts the sensor 61 at the lower sensor section 79 so that the sensor 61 emits the second detection signal 65 and transmits it to the control circuit 31. Therefore, the control circuit 31 may in particular be configured to drive the cam 27 directly from the unlocking rotational position U into the locking rotational position V when the control circuit 31 first receives the release signal 67 and then the second detection signal 65. Such a sequence of the release signal 67 and the second detection signal 65 clearly indicates that the contact element 69 was first released from the sensor 61 by moving the cam 27 into the unlocking rotational position U and the hoop 15 has moved into the open position O, wherein the subsequent second detection signal 65 indicates that the hoop 15 has been moved into the locking position B and a locking is consequently to take place. Furthermore, it is ensured by the transmitted second detection signal 65 that the hoop 15 is in the locking position B and that the cam 27 may thus be rotated trouble-free into the locking rotational position V. The control circuit 31 may generally be configured to rotate the cam 27 directly from the unlocking rotational position U into the locking rotational position V when the sensor 61 first transmits the release signal 67 and then the second detection signal 65. Alternatively thereto, provision may, however, also be made that the control circuit 31 is configured to rotate the cam 27 into the locking rotational position V only when the locking command 87 is additionally received at the radio module 81 so that a locking of the padlock 11 may also take place solely by the authorized user.

While the configuration of the cam 27 thus first makes it possible to reliably lock the hoop 15 to the lock body 13 in the closed position G or to release it for a movement into the open position O, the cam 27 furthermore has a release section 47 that is radially inwardly offset relative to the blocking section 43, wherein the release section 47 may be oriented towards the first introduction opening 17 by rotating the cam 27, starting from the unlocking rotational position U, along a second direction of rotation D2 opposite the first direction of rotation D1 and the cam 27 may be transferred into a release rotational position R. As in particular FIG. 8E shows, in this release rotational position R of the cam 27, the first introduction opening 17 is completely unblocked by the cam 27 so that the lower holding section 37 of the first introduction section 21 is also released by the cam 27 and the hoop 15 may be completely released from the lock body 13 (cf. FIGS. 8A to 8C and FIG. 10C). Moreover, in the release rotational position R of the cam 27, a second release section 49 is oriented towards the second introduction opening 19 so that the second introduction opening 19 is also unblocked by the cam 27 and the removed hoop 15 may be selectively introduced into the lock body 13 again.

Figure 8A:
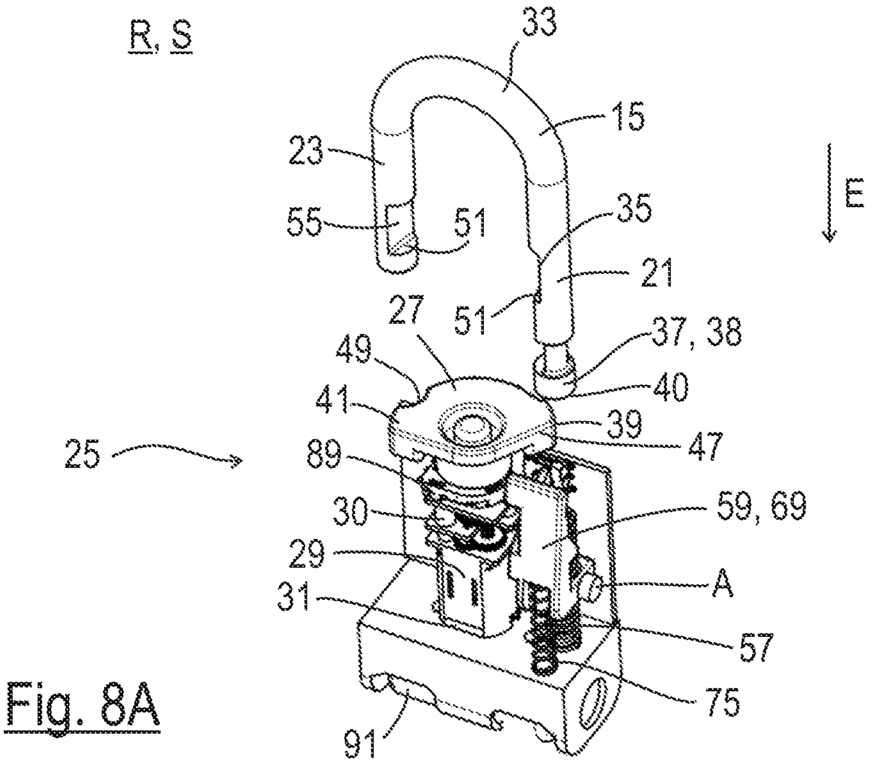
FIGS. 8A to 8E are respective representations of the padlock with the housing removed and with the cam rotated into a removal rotational position, wherein the hoop is completely released from the lock body.
Figure 8B:
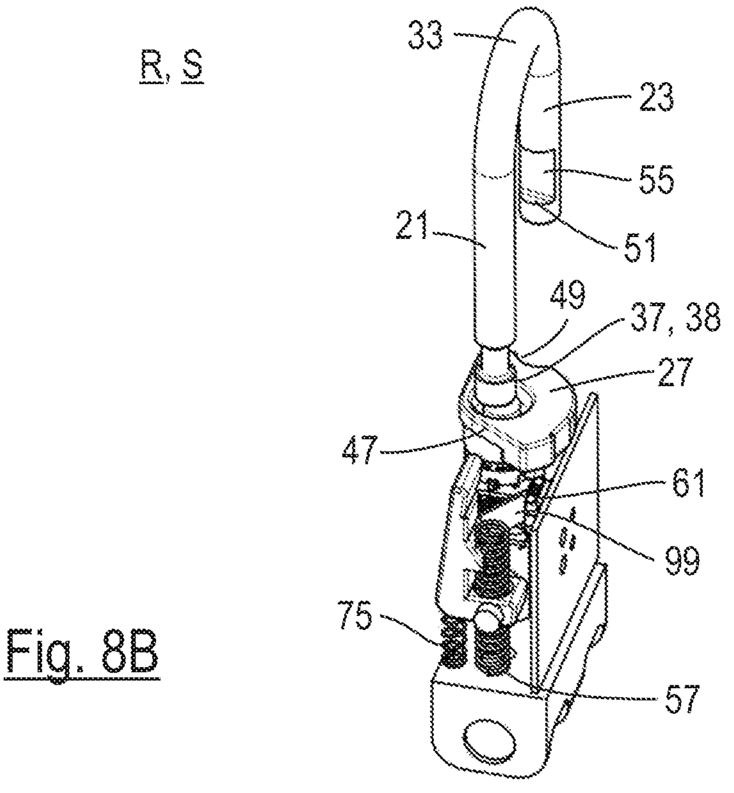
Figure 8C:
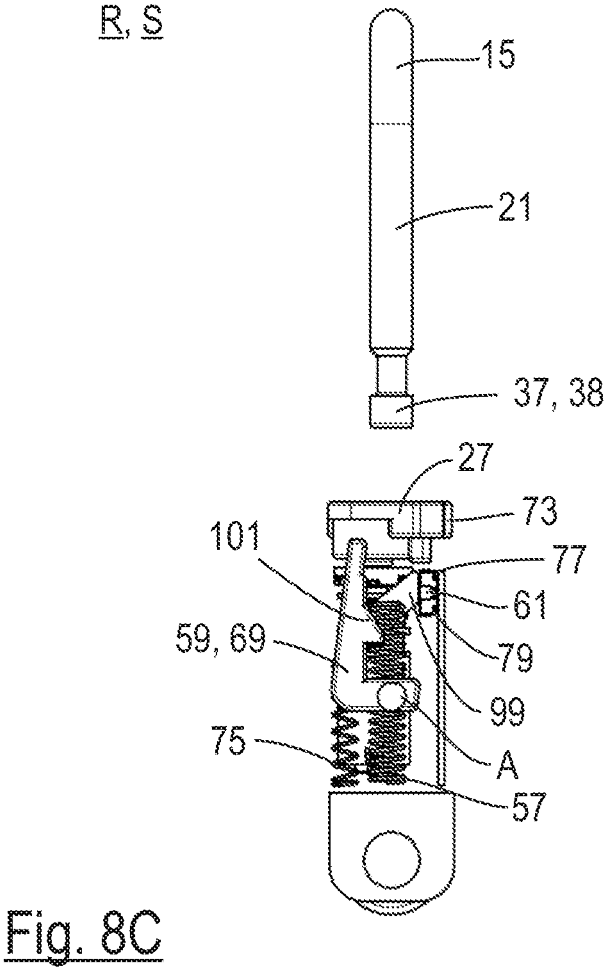
Figure 8D:
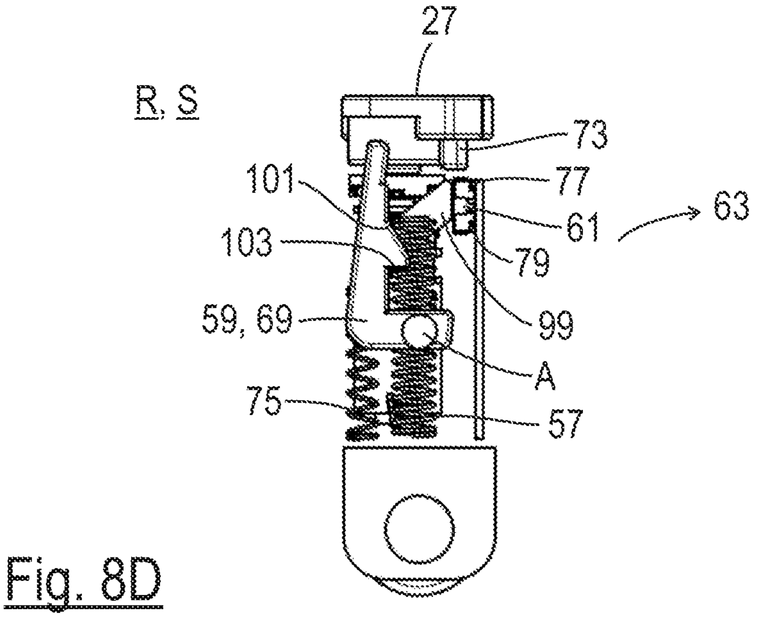
Figure 8E:
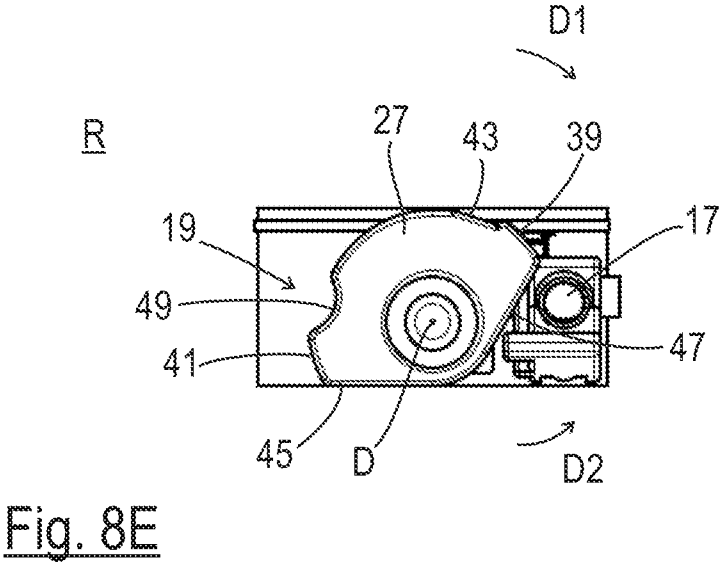
Figure 9A:
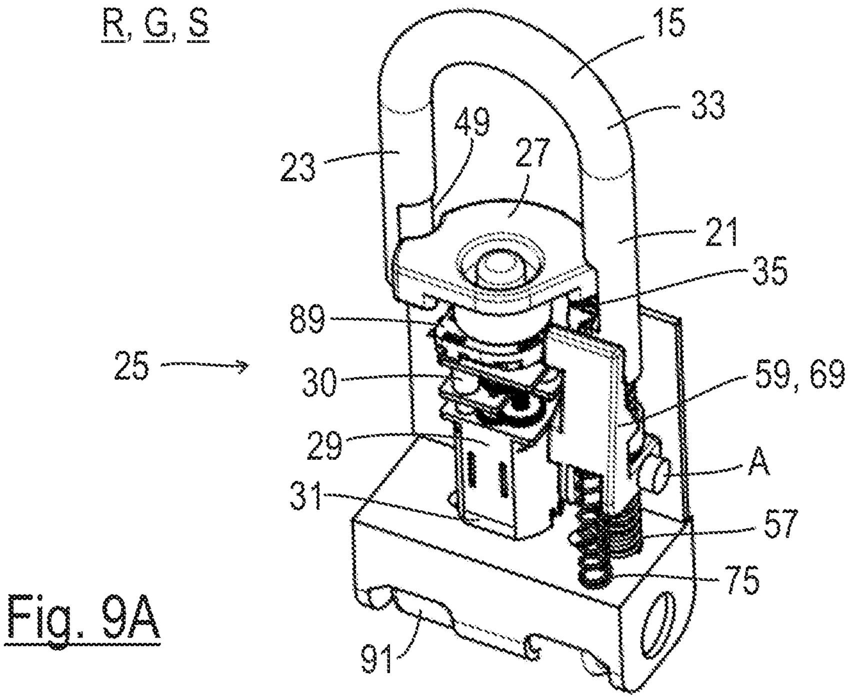
FIGS. 9A and 9B are respective representations of the padlock with the housing removed and the cam rotated into the removal rotational position, wherein the hoop is, however, brought into the locking position.
Figure 9B:
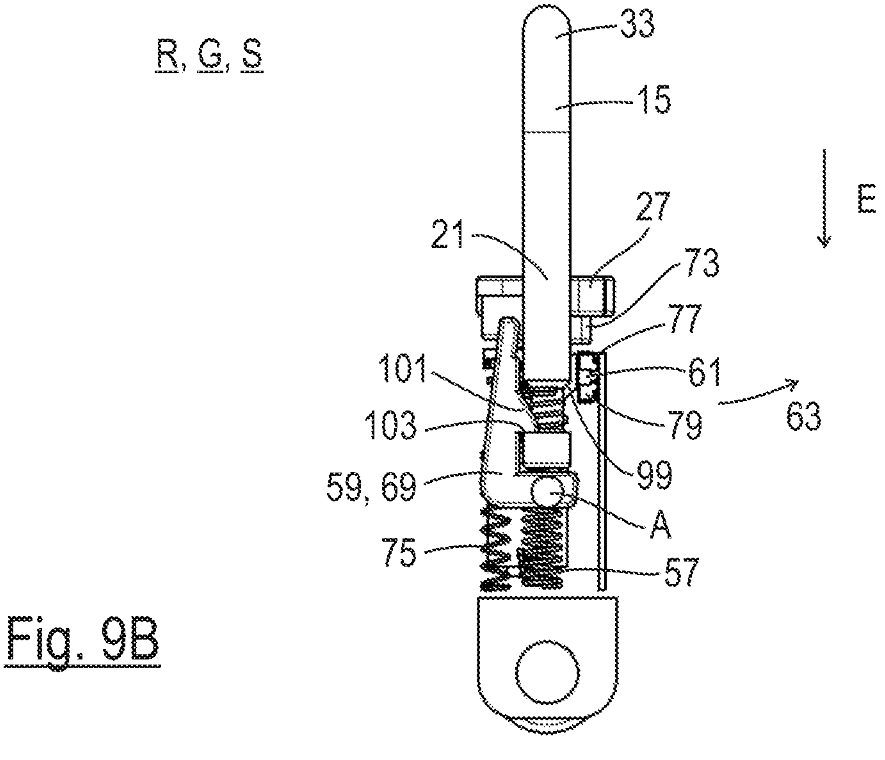

As can in particular be seen from FIG. 8D, the detent 59 or the contact element 69 is released by the entrainer section 73 for a movement into the blocking position S by the rotation of the cam 27 along the second direction of rotation D2 so that the contact element 69 comes into contact with the sensor 61 and in particular the upper sensor section 67. The sensor 61 may consequently transmit the first detection signal 63 to the control circuit 31. Provision may further be made that the control circuit 31 is configured to rotate the cam 27 into the removal rotational position R solely in response to the release command 85 received from the mobile opening device 97 so that only the authorized user may release the hoop 15 from the lock body 13.

Such a complete detachment of the hoop from the lock body 13 may, for example, allow a respective hoop 15 from a selection of different hoops 15 to be able to be selectively connected to the lock body 13 and the padlock 11 to be flexibly used. For example, due to this possibility, the U-hoop 15 shown by means of the Figures could be replaced with a rope hoop and/or a chain hoop or a larger or a smaller U-hoop and/or a U-hoop with a larger and/or smaller diameter could selectively be connected to the lock body 13. Furthermore, hoops 15 of different materials may generally be connected to the lock body 13 to be able to achieve a safety standard appropriate to a respective use of the padlock 11. Furthermore, in some applications, it may be useful to be able to completely release the hoop 15 from the lock body 13 in order to be able to bring the hoop 15 and the lock body 13 together from different sides and to secure an object.

To enable a reintroduction of the removed hoop 15 or a further hoop 15 into the lock body 13 when the cam 27 is in the removal rotational position R but the detent 59 is in the blocking position S, the detent 59 has a slanted contact surface 101 so that the detent 59 may be pivoted against the preload of the preloading element 75 into the release position F by introducing the hoop 15 that contacts the slanted contact surface 101. However, as soon as the hoop 15 reaches the closed position G, the detent 59 pivots into the blocking position S again due to the preload so that the blocking surface 103 engages over the holding section 37 and the hoop 15 is held in the closed position G by the detent 59 (cf. in particular FIG. 9B). Furthermore, as a result of the introduction of the hoop 15, the contact element 69 contacts the sensor 61, in particular the upper sensor section 77, and the control circuit 31 may be configured to rotate the cam 27 from the removal rotational position R into the locking rotational position V as a result of a briefly interrupted contact of the upper sensor section 77 or as a result of a briefly interrupted first detection signal 63 since the introduction of the removed hoop 15 may be detected by this signal sequence. However, the control circuit 31 may also be configured to drive the cam 27 into the locking rotational position V solely in response to a locking command 87 received from the opening device 97. Furthermore, it may be necessary to press the hoop 15 introduced into the lock body 13 up to and into the locking position B again in order to transmit a locking command through the contact of the lower sensor section 79.

Thus, while a control may generally be provided based solely on signals of the sensor 61, in the embodiment shown, the electromechanical locking device 25 further has a measurement device 89 that is configured to detect the rotational position of the cam 27. In this regard, information about the rotational position of the cam 27 may be directly transmitted to the control circuit 31 and considered in the control. For example, provision may therefore also be made that, starting from the position shown in FIG. 9B, a user must move the hoop 15 along the introduction direction E so that the sensor 61 is contacted by the contact section 99 of the contact element 69 at the lower sensor section 79, wherein the control circuit 31 may be configured to drive the electric motor 29 to drive the cam 27 from the removal rotational position R into the locking rotational position V when the measurement device 89 detects the removal rotational position R and the sensor 61 transmits the second detection signal 65.

The configuration of the padlock 11 with the cam 27, which may be selectively rotated into the locking rotational position V, the unlocking rotational position U and the removal rotational position F, thus enables a secure locking and a flexible use of the padlock 11. Since the cam may furthermore be rotated along opposite direction of rotations D1 and D2 from the locking rotational position V into the unlocking rotational position U or the removal rotational position F, the lock body 13 may be formed as narrow and with a small extent along a transverse direction Q oriented perpendicular to a connection line between the introduction openings 17 and 19 and perpendicular to the introduction direction E, wherein the extent of the lock body 13 in the transverse direction Q may in particular be smaller than a maximum extent of the cam 27 in a plane oriented perpendicular to the introduction direction E.

What is claimed is:

1. An electronic padlock, comprising:

a lock body and a hoop that is selectively locked to the lock body or released from the lock body, wherein the lock body includes a first introduction opening for introducing a first introduction section of the hoop and a second introduction opening for introducing a second introduction section of the hoop into the lock body;

an electromechanical locking device comprising a cam rotatable about an axis of rotation and an electric motor for driving the cam; and a control circuit, wherein the first introduction section of the hoop and the second introduction section of the hoop are connected to one another by a connection section and is introducible along an introduction direction into the first introduction opening and the second introduction opening, wherein the first introduction section has a lower holding section with respect to the introduction direction and an upper locking notch, wherein the cam is configured, in a locking rotational position, to directly contact and engage into the upper locking notch of the first introduction section and to lock the hoop to the lock body;

in an unlocking rotational position, to disengage from and release the upper locking notch and to directly contact and hold the first introduction section at the lower holding section; and in a removal rotational position, to disengage from and release the lower holding section of the first introduction section and to thereby release the hoop for a complete detachment from the lock body, wherein the control circuit is configured to control the electric motor to selectively drive the cam into the locking rotational position, the unlocking rotational position, and the removal rotational position.

2. The electronic padlock according to claim 1, wherein the cam has:

a first locking section that projects radially outwardly with respect to the axis of rotation and that is configured to directly contact and engage into the upper locking notch in the locking rotational position of the cam;

a blocking section that is radially inwardly offset relative to the first locking section and that is configured to come into direct contact with the lower holding section of the first introduction section in the unlocking rotational position of the cam; and a release section that is radially inwardly offset relative to the blocking section and that is oriented towards the first introduction opening in the removal rotational position.

3. The electronic padlock according to claim 1, wherein the cam, starting from the locking rotational position, is moved into the unlocking rotational position by a rotation along a first rotational direction and is moved into the removal rotational position by a rotation along a second rotational direction opposite the first rotational direction.

4. The electronic padlock according to claim 1, wherein the lock body has, as measured in a transverse direction oriented perpendicular to the introduction direction and perpendicular to a connection line between the first introduction opening and the second introduction opening, a maximum thickness that is smaller than a maximum extent of the cam as measured in any direction within in a plane oriented perpendicular to the introduction direction.

5. The electronic padlock according to claim 1, wherein the lock body further has a preloading element that is configured to preload the hoop, when the hoop is introduced into the lock body against the introduction direction, and wherein the lock body comprises a detent for the hoop that is configured to hold the hoop, when the hoop is introduced into the lock body against the preload in the lock body, in a locking position, in which the cam is rotatable into the locking rotational position.

6. The electronic padlock according to claim 5, wherein the cam is configured to contact the detent on a rotation from the locking rotational position into the unlocking rotational position and to move the detent into a release position, in which the detent releases the hoop for a detachment from the lock body.

7. The electronic padlock according to claim 1, wherein the lock body comprises a sensor that is configured to detect when the hoop is in a locking position in which the hoop is lockable to the lock body by rotating the cam into the locking rotational position, and to detect when the first introduction section is held at the lower holding section by the cam positioned in the unlocking rotational position, and wherein the sensor is configured to transmit respective detection signals to the control circuit.

8. The electronic padlock according to claim 7, further comprising a contact element that is configured to contact the sensor when the hoop is in the locking position and to release from the sensor when the hoop is held by the cam at the lower holding section.

9. The electronic padlock according to claim 8, wherein the contact element is preloaded towards the sensor and is pivoted against the preload by introducing the hoop, that has been released from the lock body, back into the lock body.

10. The electronic padlock according to claim 8, wherein the contact element is a detent that is configured to hold the hoop in the locking position in the lock body.

11. The electronic padlock according to claim 8, wherein the contact element is pivotable, and wherein the cam is configured to pivot the contact element with an entrainer section on a rotation from the locking rotational position into the unlocking rotational position, and to thereby release the contact of the contact element from the sensor.

12. The electronic padlock according to claim 11, wherein the contact element is preloaded to pivot the contact element towards the sensor and to contact the sensor, wherein the contact element is urged by the preload to a position under the entrainer section by movement of the hoop along the introduction direction into the locking position, such that the contact element pivots towards the sensor and to contact the sensor.

13. The electronic padlock according to claim 8, wherein the control circuit is configured to control the electric motor to drive the cam from the unlocking rotational position, as a result of the contact element first releasing from the sensor and then contacting the sensor.

14. The electronic padlock according to claim 8, wherein the sensor has an upper sensor section and a lower sensor section and is configured to transmit a first detection signal to the control circuit when the upper sensor section is contacted by the contact element and to transmit a second detection signal to the control circuit when the lower sensor section is contacted by the contact element.

15. The electronic padlock according to claim 14, wherein the contact element is preloaded towards the upper sensor section.

16. The electronic padlock according to claim 14, wherein the control circuit is configured to control the electric motor to drive the cam from the unlocking rotational position into the locking rotational position, as a result of the contact element first releasing from the upper sensor section and then contacting the lower sensor section of the sensor.

17. The electronic padlock according to claim 14, wherein the contact element is configured to contact the sensor at the upper sensor section as a result of a rotation of the cam from the unlocking rotational position into the removal rotational position.

18. The electronic padlock according to claim 17, wherein the control circuit is configured to control the electric motor to drive the cam from the removal rotational position into the locking rotational position after a transmission of the first detection signal from the sensor when the sensor is released by the contact element and is then contacted again.

19. The electronic padlock according to claim 14, wherein the contact element is configured to contact the sensor at the upper sensor section when the hoop is in the locking position, wherein when the hoop is moved towards the locking position along the introduction direction, the contact element is configured to contact the lower sensor section of the sensor, and wherein the control circuit is configured to control the electric motor to drive the cam from the locking rotational position into the unlocking rotational position when the sensor first transmits the first detection signal and then transmits the second detection signal.

20. A padlock, comprising a lock body, a rotatable cam, and an electric motor in the lock body, and a hoop having a first limb and a second limb, wherein the lock body comprises a first introduction opening for receiving the first limb and a second introduction opening for receiving the second limb of the hoop;

wherein the first limb of the hoop has a lower abutment and an upper abutment, the lower abutment being located closer to a free end of the first limb than the upper abutment;

wherein the cam, when in a locking rotational position, directly contacts and engages the upper abutment of the first limb to lock the hoop to the lock body when the first limb is introduced into the first introduction opening; and wherein the electric motor selectively drives the rotatable cam into an unlocking rotational position, in which the cam releases the upper abutment but directly contacts and blocks the lower abutment of the first limb to movably hold the first limb at the lock body; and a removal rotational position, in which the cam releases the lower abutment of the first limb for a complete detachment of the first limb from the lock body.

21. An electronic padlock comprising a lock body and a hoop that is introduced into the lock body, wherein when the hoop is introduced into the lock body, the hoop is selectively locked to the lock body in a closed position or released for a movement into an open position relative to the lock body, wherein the lock body comprises:

a cam that is rotatable about an axis of rotation, which defines an axial direction, into an unlocking rotational position and into a locking rotational position, an electric motor for driving the cam; and a control circuit that is configured to control the electric motor to selectively drive the cam into the locking rotational position and the unlocking rotational position, wherein when the hoop is introduced into the lock body, the hoop is locked to the lock body by rotating the cam into the locking rotational position, and wherein the locking of the hoop to the lock body is releasable by rotating the cam into the unlocking rotational position, wherein when the locking of the hoop to the lock body is released, the hoop is moveable into the open position and the cam is in the unlocking rotational position, wherein when the hoop is positioned in the open position and the cam is in the unlocking rotational position, the hoop is capable of being introduced back into the lock body, and wherein the lock body comprises a detent that holds the hoop against removal from the lock body when the hoop is introduced back into the lock body when the cam is positioned in the unlocking rotational position, wherein, while the hoop is held by the detent against removal from the lock body, the cam is rotatable from the unlocking rotational position toward the locking rotational position and thereby locks the hoop to the lock body;

wherein the hoop has a locking notch, wherein the locking notch of the hoop overlaps the cam along the axial direction when the cam is in the locking rotational position and the hoop is locked to the lock body, wherein the detent includes a blocking surface that engages the hoop when the detent holds the hoop against removal from the lock body, and wherein, when the hoop is locked to the lock body, the locking notch is positioned offset in the axial direction from the blocking surface of the detent and the detent does not engage into the locking notch.

22. The electronic padlock according to claim 21, wherein a removal direction of the hoop is in an upward direction, and the blocking surface of the detent is disposed below the cam along the axial direction and engages the hoop to hold the hoop against removal from the lock body at a point that is offset along the axial direction from the cam.

* * * * *